(12) United States Patent
Franken

(10) Patent No.: US 12,220,934 B2
(45) Date of Patent: Feb. 11, 2025

(54) METHOD OF PRINTING AUTHENTICATION INDICATORS WITH AMPLITUDE MODULATED HALFTONE PRINTING

(71) Applicant: U-NICA SYSTEMS AG, Landquart (CH)

(72) Inventor: Klaus Franken, Igis (CH)

(73) Assignee: U-NICA SYSTEMS AG, Landquart (CH)

( * ) Notice: Subject to any disclaimer, the term of this patent is extended or adjusted under 35 U.S.C. 154(b) by 0 days.

(21) Appl. No.: 17/426,010

(22) PCT Filed: Jan. 20, 2020

(86) PCT No.: PCT/EP2020/051275
§ 371 (c)(1),
(2) Date: Jul. 27, 2021

(87) PCT Pub. No.: WO2020/152099
PCT Pub. Date: Jul. 30, 2020

(65) Prior Publication Data
US 2022/0150378 A1   May 12, 2022

(30) Foreign Application Priority Data

Jan. 27, 2019 (EP) .................... 19153855

(51) Int. Cl.
*H04N 1/32* (2006.01)
*B42D 25/21* (2014.01)
(Continued)

(52) U.S. Cl.
CPC ........... *B42D 25/21* (2014.10); *G06V 10/751* (2022.01); *H04N 1/32245* (2013.01);
(Continued)

(58) Field of Classification Search
CPC ............ H04N 1/32203–32352; H04N 1/4051
See application file for complete search history.

(56) References Cited

U.S. PATENT DOCUMENTS 7,366,301 B2   4/2008   Huang et al.
7,512,249 B2   3/2009   Alasia et al.
(Continued)

FOREIGN PATENT DOCUMENTS

DE   69729118 T2   4/2005
EP      1477026 B1   6/2011
(Continued)

OTHER PUBLICATIONS

Pritchard, The Print Guide, May 24, 2009 (Year: 2009).*
Heidelberg, "Einführung in die Rastertechnologie", 2007, 81 pages, Heidelberger Druckmaschinen AG, Heidelberg, Germany.

*Primary Examiner* — Barbara D Reinier
(74) *Attorney, Agent, or Firm* — The Webb Law Firm

(57) ABSTRACT

A method of printing authentication indicia by applying an at least amplitude-modulated halftone print in a detection zone to an object uses adjoining halftone cells, in each of which a halftone dot is printed from a matrix of printable halftone elements, individual tone values of the halftone print corresponding in each case to a halftone plane of a halftone mountain for a halftone dot. In this process, the assigned screen plane of the screen mountain is modified in the detection zone in a predetermined manner for a plurality of tone values of screen dots to be printed, so that a predetermined matrix image of the screen elements to be printed is assigned to it while the tone value of the print remains constant.

15 Claims, 15 Drawing Sheets

(51) Int. Cl.
*G06V 10/75* (2022.01)
*H04N 1/405* (2006.01)

(52) U.S. Cl.
CPC ..... *H04N 1/32256* (2013.01); *H04N 1/32309* (2013.01); *H04N 1/4051* (2013.01)

(56) References Cited

U.S. PATENT DOCUMENTS

| | | | |
|---|---|---|---|
| 7,561,308 B2 | 7/2009 | Alasia et al. | |
| 7,684,088 B2 | 3/2010 | Jordan et al. | |
| 8,019,115 B2 | 9/2011 | Alasia et al. | |
| 8,284,987 B2* | 10/2012 | Ulichney | H04N 1/32219 |
| | | | 382/100 |
| 9,681,020 B2 | 6/2017 | Göktekin | |
| 9,818,249 B1 | 11/2017 | Fraser et al. | |
| 10,778,868 B2* | 9/2020 | Kunstetter | H04N 1/40043 |
| 2003/0128395 A1* | 7/2003 | Sharma | H04N 1/52 |
| | | | 358/3.06 |
| 2003/0210431 A1* | 11/2003 | Rylander | H04N 1/4051 |
| | | | 358/3.06 |
| 2006/0170974 A1 | 8/2006 | Wang et al. | |
| 2007/0024914 A1* | 2/2007 | Chung | H04N 1/4055 |
| | | | 358/3.26 |
| 2016/0088181 A1* | 3/2016 | Chen | G06K 15/4095 |
| | | | 358/2.1 |
| 2017/0024845 A1* | 1/2017 | Filler | H04N 1/32 |
| 2018/0152596 A1* | 5/2018 | Veis | H04N 1/4055 |

FOREIGN PATENT DOCUMENTS

| | | |
|---|---|---|
| WO | 9935819 A1 | 7/1999 |
| WO | 2006013037 A1 | 2/2006 |
| WO | 2015067725 A1 | 5/2015 |
| WO | 2015130697 A1 | 9/2015 |
| WO | 2016196493 A1 | 12/2016 |

* cited by examiner

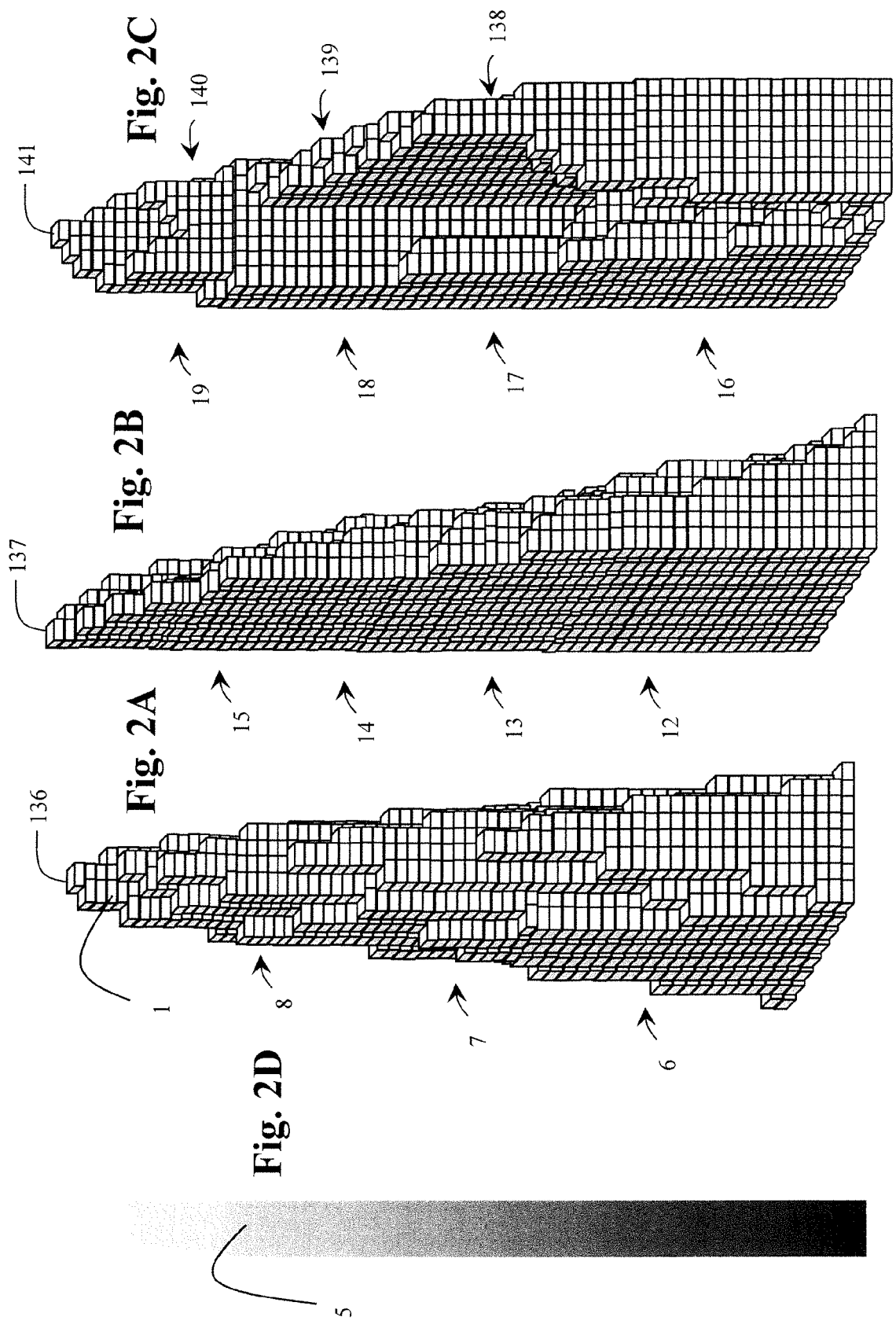

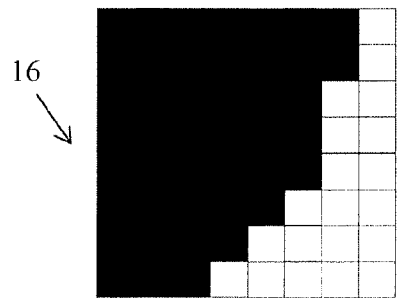
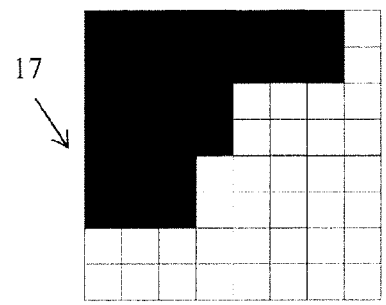
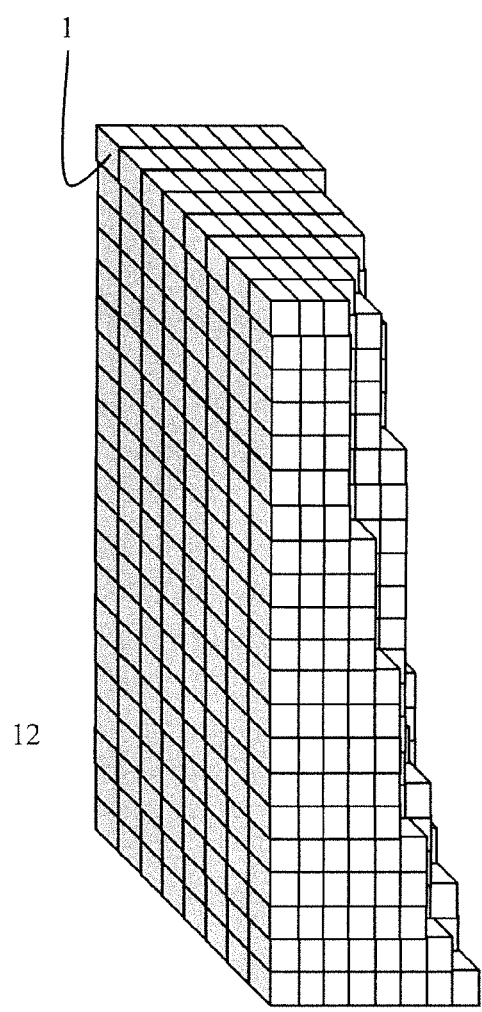
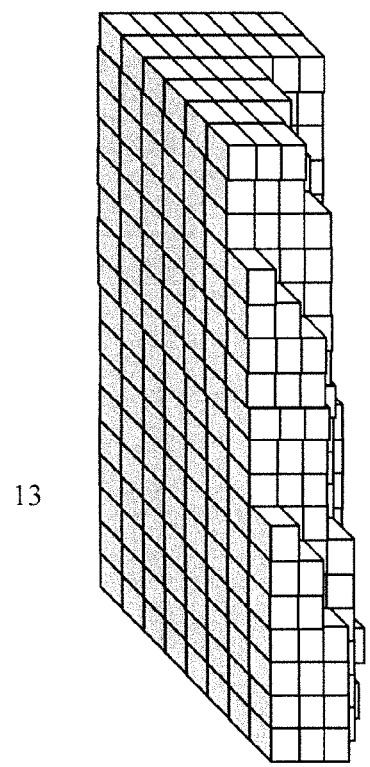
Fig. 3D　　　　　　　　Fig. 3E

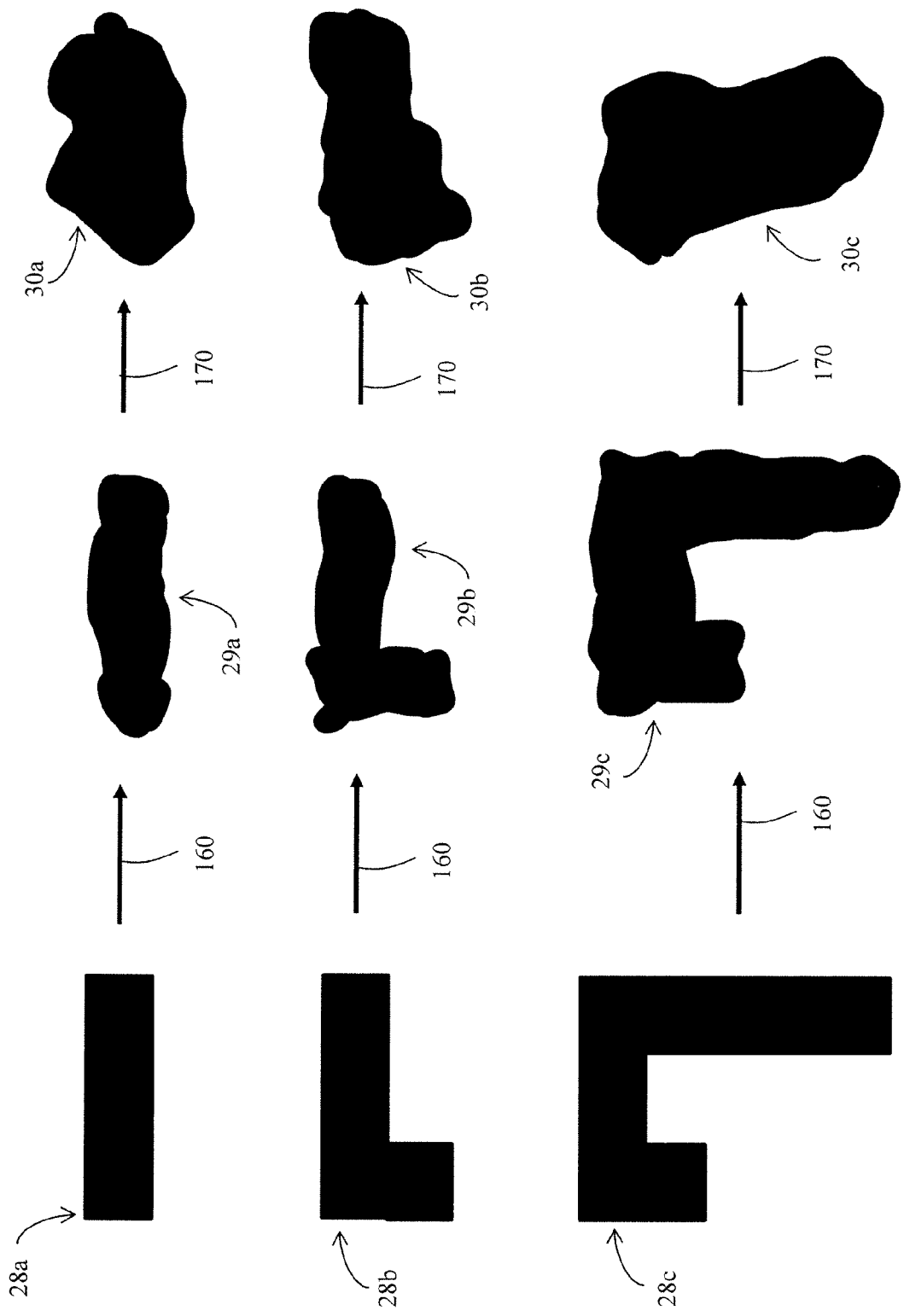

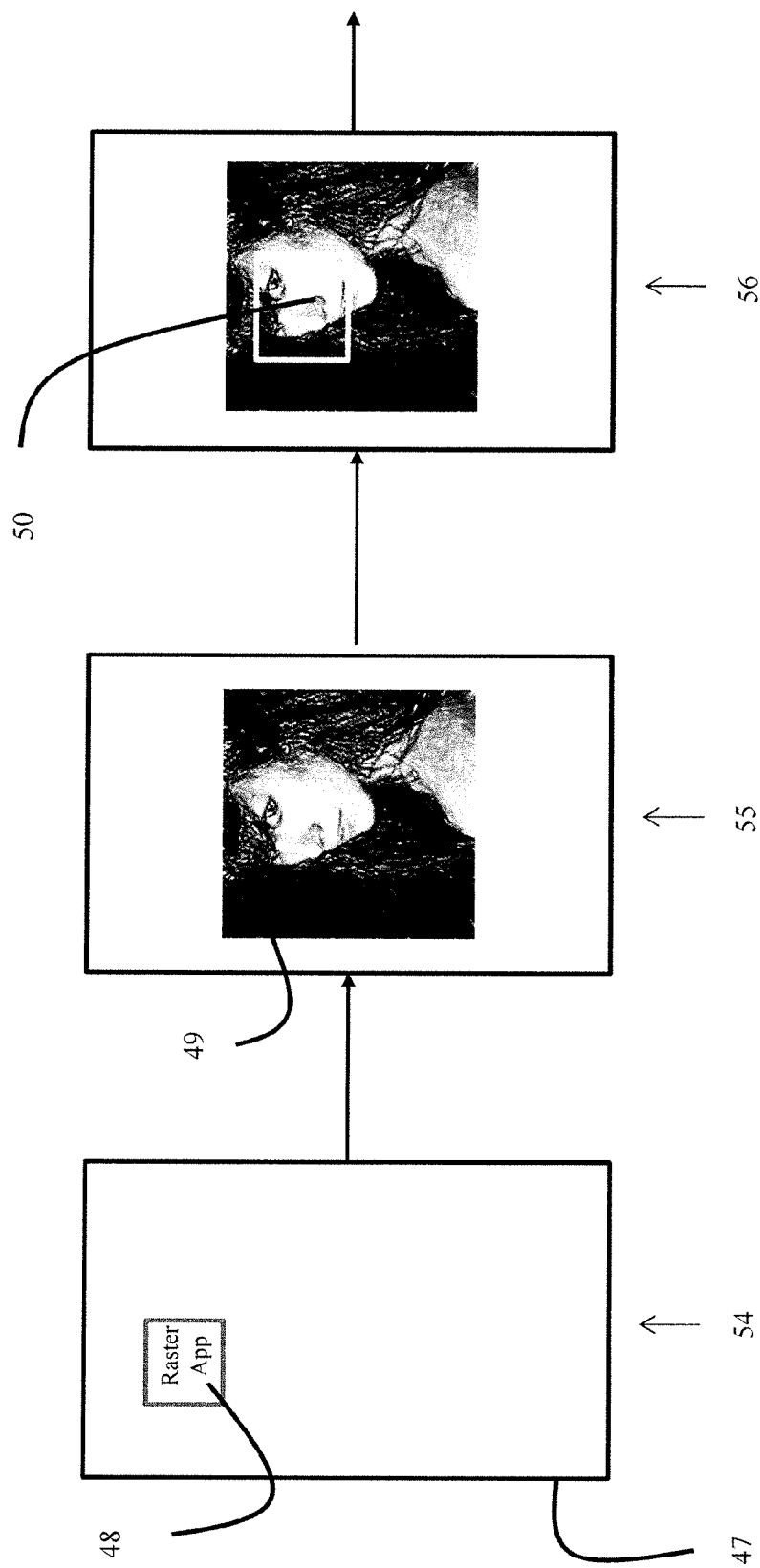

METHOD OF PRINTING AUTHENTICATION INDICATORS WITH AMPLITUDE MODULATED HALFTONE PRINTING

CROSS-REFERENCE TO RELATED APPLICATIONS

This application is the United States national phase of International Application No. PCT/EP2020/051275 filed Jan. 20, 2020, and claims priority to European Patent Application No. 19153855.2 filed Jan. 27, 2019, the disclosures of which are hereby incorporated by reference in their entirety.

BACKGROUND OF THE INVENTION

Field of the Invention

The present invention relates to a method of printing authentication indicators by applying at least amplitude modulated halftone printing in a detection zone to an object, wherein the printed area of the detection zone comprises adjoining halftone cells, in each of which halftone cells a halftone dot is printed from a matrix of printable halftone elements.

Description of Related Art

Today's need for effective product protection against counterfeiting goes far beyond the application of distinctive visual features, which until a few years ago was considered sufficient on its own. Holograms in particular had earned a reputation for sufficiency as high-quality protection. With tens of thousands of hologram production and reproduction studios spread around the world, the value of hologram applications on packaging has become much more relative. A comparison of an original of a package with its counterfeit does not escape even the untrained eye, while a professional can recognize a counterfeit as such without a comparison with the original.

Other security features, such as the use of luminescent pigments in the printing of lettering, are not considered secure, with many classic features being second-level features for which auxiliary devices such as UV lamps, in the example of the luminescent features mentioned, are not constantly available to authenticate a product or document. Consumers as well as professional examiners of the originality of a product do not want to have to make use of any special auxiliary devices in order to be able to assess the authenticity of a product.

In fact, only smartphones or comparable devices are accepted as ubiquitous aids, whereby their possibilities of a certain machine intelligence as well as their electronic networking are very welcome. The application programs that can be easily installed on these devices, the so-called apps, can use the camera attached to the smartphone, tablet, etc. and, if necessary, the other sensors and product to recognize, analyze to a certain extent and, if necessary, make the result available to the servers, compare their own authentication result with other data from the network or download supplementary data. Closely related to authentication via smartphone is the convenient download of supplementary information, such as serial numbers, the suggestion of suitable spare parts, etc., which is generally referred to as "Augmented Reality". This is generally subsumed under the term "augmented reality.

In this context, one- and two-dimensional barcodes have become a quasi-standard for recognizing a product or its packaging. There is virtually no packaging that does not have a data code applied to it at some point. Many devices from original manufacturers even require apps to use their full range of functions. This has led to the widespread belief that a barcode, especially a two-dimensional barcode, is a good protection against counterfeiting because it reliably allows the identification of a single product. In fact, this alone is a misconception, insofar as a barcode is in itself a very robust feature or marking that is easy to copy and, as such a copy, also performs its services as data carrier or represents a readable link.

This raises the question of how a package or document can be protected against a high-resolution scan or a high-quality print. This gives rise to the need for a method of identifying the print on a package or document as the original print. In expert circles, such a procedure is known briefly as "copy detection". Various concepts for authentication in the manner described have been proposed and some have also been introduced on the market.

One of these concepts is print motifs with a repetitive structure embedded in graphics or images. WO 99/35819 describes a method in which two images are screened in such a way as to produce a combined image, the second image being embedded within the first image in such a way that, on the one hand, it is not visible to the unaided eye and, on the other hand, it can be revealed by means of an optical auxiliary device encoded at the correct frequency, similar to a lenticular lens, or also by electronic means. This teaching makes use of the fact that the half-tone or raster period of a print forms a repetitive pattern. It has been proposed to rasterize a second image according to certain specifications and to unify this raster with the raster of the primary image in such a way that the primary image remains visible and the secondary image remains latent. In this way, for example, lettering, a portrait, or a barcode can be hidden in the primary image. In the case of the barcode, electronic decoding is also possible, since a laser scanner can virtually "see through" the raster pattern of the primary image, provided it has the correct position relative to the embedded barcode. The method does not satisfy the need for authentication with a smartphone. The manipulation of the raster is also not completely hidden from the eye of the specialist and is not desirable for very high-quality multicolor prints.

The method according to EP-B-1 477 026, in which a primary image is modulated with a line pattern based on a second image in such a way that the second image can be hidden in the first image and revealed with an optical filter, works in a very similar way.

Another frequency-oriented approach is offered by U.S. Pat. No. 7,366,301, according to which several layers of a frequency grid are superimposed at once. In these cases, these patterns are based on phase-modulated image data. In this case, too, an optical filter with a suitable frequency is needed to reveal the embedded information. Here, a filter with the appropriate frequency is needed for each layer, with each of the layers serving as a carrier for its own watermark. Authentication is achieved by decrypting the watermarks of all layers.

US-B-7,5122,449 also uses a hidden image as the basis for authentication. In this case, an image is encoded with a variety of parameters, such as phase shifts. U.S. Pat. No. 7,561,308, from the same patent family, also relies on at least a second hidden image. In order to make the hidden image(s) visible, a control image is required, the rasterization of which has been performed with a certain frequency and orientation. Authentication is performed by a pixel-by-pixel comparison with the control image.

All of the above concept variants require the integration of at least a second piece of information for the authentication of an original, where the second piece of information can be an image, for example. Furthermore, an encryption step based on frequency modulation of a line pattern or dot line pattern is required. A forgery without this integrated second (image) information is conspicuous during the authentication process, but for a copy detection these methods are only conditionally usable. It is conceivable that with sufficiently high resolution of scan and reprint, the repetitive structures are preserved. Furthermore, the optical auxiliary devices or filters that are sometimes required are considered obsolete and represent an undesirable limitation for a smartphone-oriented process for authentication or proof of originality or copy detection. In principle, it is possible to analyze a frequency pattern with a smartphone or similar device. However, the disadvantage remains that in all cases additional information—an image or a graphic—must be encoded and embedded. It is not widely accepted by document publishers or brand manufacturers that in most cases the image manipulation is noticeable after all—at a second glance, as it were. The method described in the above-mentioned U.S. Pat. No. 7,366,301 is used in practice in such a way that an authentication field is reserved on a package which appears to the viewer to be a rectangle with a uniform coarse-grained gray. The authentication field, like the two-dimensional barcode (QR code), is an additional graphic feature whose purpose is revealed to the viewer as an obvious frequency grid when viewed enlarged.

U.S. Pat. No. 8,019,115 offers a departure from graphic frequency-oriented methods, although elements of the above ideas can still be seen. U.S. Pat. No. 8,019,115 reclaims for authentication a portable image capture device that is positioned over a selected section of the original image, illuminated and magnified with a suitable light, and relays image data to an authentication module. The disclosure also discloses the use of an upstream optical element. The original image may be based on a rasterization, an optically encoded graphic or writing.

Another approach is offered by proposals for modification of QR codes present on practically all packaging and many documents. The authors of WO-A-2015/067725 reserve an information field within or on a QR code (in practice placed in the middle of the QR code), which is characterized by its own structure with subcells with edge lengths smaller than 50 µm. This information field provides space a second information without changing or making illegible the first information of the QR code, the actual barcode information. The second information is useful for authentication and can also act as copy detection to some degree. However, the feature is obviously recognizable and only protects the originality of the QR code.

A similar approach is offered by U.S. Pat. No. 9,681,020, which also offers a pattern consisting of cells on a document as an information carrier. This is also conspicuous and causes an additional effort for the implementation. For use as a copy detection feature, this type of encoding is not intended and offers little protection against high-resolution scanning and printing.

Another variant of a non-copyable 2D barcode is presented in WO-A-2006/013037. Within the QR code there are grid cells with grid dots and patterns, which in turn consist of sub-patterns constructed according to certain rules. In this way, information bits can be stored in the raster cells and copy detection can be achieved.

WO2015/130697 discloses a method for identifying a printed item by means of an image recording that discloses artifacts that inevitably occur together with printing. The method is particularly focused on QR codes and thus treats an individual QR code as a kind of fingerprint. Once the printed mark has been registered as a digital fingerprint, it is of course no longer possible to copy it, as further artifacts creep in and alter the fingerprint. However, this type of copy protection is related to individual copies of a print and, according to the invention, is used for track & trace purposes. It is not copy detection in the sense that a large number of printed copies, e.g. in the form of printed folding boxes, are identified in such a way that they can be distinguished from an (illegal) copy.

A completely different path is taken by U.S. Pat. No. 7,684,088. In this case, a digital mark is applied to a printed or embossed surface by selecting a set of pixels with a size not exceeding 300 dpi (i.e. smaller than 80 µm). The pixels of the digital mark are modified according to pseudo-random criteria and then applied to a printed visible element. The apparently randomly distributed pixels are recognizable on the original print, but are no longer preserved on a copy in such a way that the digital mark can be detected. This type of copy protection is particularly effective when the pixel color of the digital marking is similar to the color of the overprinted background. For example, a yellow pixel color has proven effective on a white background. The process becomes problematic to impossible if the background is multicolored, has different colors and shades. In these cases, the digital marking can hardly be differentiated from the underlying print.

None of the concepts described solves the problem of distinguishing a high-quality original print of a multicolor image with an arbitrary motif from its copy without manipulating the image data in some way before printing or supplementing it with additional data. Known methods for integrating watermarks are not applicable to the problem as a solution, since copy detection does not involve the transport of embedded information. Similarly, digital fingerprinting methods, which are designed for the identification and authentication of individual items or documents, cannot be adapted to the problem of proving the originality of mass-produced print products.

SUMMARY OF THE INVENTION

Based on the aforementioned prior art, it is an object of the present invention to provide a method for enabling a person to distinguish an original high-quality print of a multicolor image with any motif from its copy without in any way altering for a viewer the image elements visually recognizable by him before printing, such as for example supplementing them with additional artifacts visually recognizable by the viewer with the naked eye.

According to the invention, this task is solved for a method of printing authentication indicators by applying an at least amplitude-modulated halftone print in a detection zone to an object, the printed area of the detection zone comprising adjoining halftone cells, in which halftone cells one halftone dot each is printed from a matrix of printable halftone elements, wherein individual tone values of the halftone printing each correspond to a halftone plane of a halftone mountain for a halftone dot, wherein in the detection zone, in a predetermined manner for a plurality of tone values of halftone dots to be printed, the associated halftone plane of the halftone mountain is modified so that a predetermined matrix image of the halftone elements to be printed is assigned to it while the tone value of the printing remains constant.

It can also be formulated differently that in the detection zone, except for the tone values 0% and 100%, an asymmetrical distribution of the halftone elements is assigned to the assigned predetermined halftone mountain in a predetermined manner for a plurality of the possible tone values of a respective halftone dot to be printed.

The modification of the matrix image is to be provided in such a way that in a photograph of a detection zone of such a packaging, with a sufficient resolution, the shape of the raster matrix and the raster dot resulting from the raster elements can be recognized. When a copy print template is created from a photographed original by a third party who creates copied packaging, deviations in the print image of the packaging printed in this way occur, so that these deviations can be detected by a corresponding descriptor program as a copy and thus as a counterfeit.

The process can also be constructed from a combination of amplitude-modulated halftone printing and frequency-modulated halftone printing. The halftone mountain specifies the maximum possible number of tone values between 0% and 100% in the resolution of its plane. The print can be divided into a print in one or more detection zones on the object and the remaining print area. The remaining print area is printed in the RIP according to the prior art, in particular with dot-symmetrical halftone dots or also ellipses etc. At least in the detection zone, individual halftone dots are printed in the adjacent halftone cells from an array or matrix of printable halftone elements, in which, in a predetermined manner, for a plurality of tone values of respective halftone dots to be printed from the associated predetermined halftone mountain, a symmetry of the halftone elements to be printed which differs from at least one tone value in a predetermined manner is assigned, so that these different halftone dots can be detected for verification.

There are two basic options for obtaining the decision whether or not to print a halftone dot: The threshold matrix or a lookup table. In the first method, 'threshold values' are stored in a matrix and compared with the tone value of the image at the corresponding position. This threshold matrix looks like a mountain landscape and leads to the concept of a halftone mountain. If the tone value of the original is greater than the comparison value in the matrix, the corresponding pixel is exposed, otherwise it is not exposed. This comparison operation acts as if cutting planes are placed through the halftone mountain. In the second realization, a corresponding bit pattern is stored for each possible tone value plane. Rasterizing is done by searching for the corresponding plane in the memory for the tone value and outputting the bit pattern directly. The cross-sectional images in FIGS. 3A to 3K are such halftone mountain planes or raster maps.

The term tonal value (from 0 to 100%) means an area coverage in printing compared to, for example, a data value from 0 to 100% for area coverage in a corresponding file of an image or a film. A tonal value correction can be made in a print from data values, in the brightness, the contrast or the gamma value. This is usually done on the basis of a dot gain or tonal value increase.

In particular, a large number of tonal values can deviate from the dot symmetry of 0% and 100%, so that a large number of halftones can be printed with these asymmetrical halftone dots.

The distribution of halftone elements for a predetermined tone value in the matrix of a halftone cell can be selected in particular from a distribution group comprising the most interesting asymmetrical distributions. These include printing one or two opposite corners of a halftone cell, an edge line of a halftone cell, a C, which can also be realized as a combination of three edge lines, an L or two edge lines meeting in a corner, a T or an edge line with a center bar, or any other non-point-symmetric and non-axisymmetric printing shape.

The distribution of the halftone elements in a halftone mountain can change from the tonal value 100% to the tonal value 0% from the point-symmetrical full print via a printing form having a certain modification or asymmetry from the distribution group to at least one printing form having a different modification from the distribution group to the first-mentioned, i.e. a hollowing out of the printing form to a U or C and a deformation from this via a T to an edge line, which then leads at a tonal value of a few percent in a halftone element in a corner or on the side line.

Two or more detection zones can also be provided, with the halftone mountains for the same color in each two detection zones being the same or different to each other. The detection zones can also be provided for other colors from the color space of the print. The detection zones can also be adjacent to each other.

The halftone mountains for different colors can be the same or different from each other, and based on the printing processes for such different colors, essentially the last two ink applications are used.

Associated with the printing method is, of course, an authentication method for an article printed in accordance with the invention. This comprises providing a portable image capture device having a microprocessor for executing an authentication program. This may typically be a smartphone or tablet computer. The smartphone or tablet computer is provided with the print images resulting from halftone mountain data for a predetermined number of halftone dots of the printed article from a detection zone with a predetermined tonal value, usually in the form of a database that is stored in the smartphone's memory or can be queried online. These may be threshold values for a 3D curve of a halftone mountain or a lookup table for individual tone value levels. The results of the recording and evaluation of the print image can also be transmitted to a server of the operator for a subsequent comparison, in order to enable the operator to detect copies at the same time. Otherwise, the provided computer program for comparing the captured halftone dots with the print image predetermined from the halftone mountain data for the same tonal value can be executed in the smartphone, the method comprising the further steps of capturing an image of a detection zone of the printed object, selecting a predetermined number of halftone dots in said detection zone, comparing the captured print image of these halftone dots with the print images for the same tonal value predetermined from the halftone mountain data, and deciding on the basis of the comparison whether or not there is an original print on the object. As mentioned, this comparison can also be done remotely on the computer program supplier's server, so that no database data needs to be present or transferred in the smartphone. Then only predetermined groups of halftone points must be stored or can also be retrieved online.

In the authentication process, random or predetermined different halftone points to be compared can be selected from the detection zone.

This invention thus provides protection of documents and goods against unauthorized reproduction, counterfeiting, falsification and misuse thereof, for example by deceiving customers with counterfeit goods and warranty documents or using illegal distribution channels. In particular, the invention is directed to counterfeiting with illegally scanned and reprinted documents and packaging of branded goods, such as spare parts or luxury foods of well-known manufacturers.

In other words, it is the task of the present invention to make an illegal copy of a document or packaging recognizable without adding visible features, as graphic symbols such as logos based on vector files, fonts or pixel files, to the document or packaging in a conspicuous manner specifically for this purpose. On the other hand, an image must be preserved on the original print in such a way that the graphic quality of the image is not degraded by the authentication features added according to the invention. For logos or applied images, there are generally strict specifications, e.g. marketing specifications, regarding size or other graphic dimensions or the color scheme.

Prior art methods have weaknesses in this respect, since more or less conspicuously protected documents or packaging have features that are either easily recognizable visually to an insider, for example frequency-modulated line or pixel sequences, or are conspicuous due to the poor photographic quality of a visible image, or are too transferred to the copy in the case of illegal copying, are too robust, so to speak, in relation to the desired structural change of the image composition. For detecting an illegal copy or authenticating an original in the field of document and product protection, the term copy detection has also been introduced and will be so used hereinafter. The invention takes into account, firstly, the requirement to maintain the usual high image quality, with printing resolutions of, for example, 40 to 150 lines/cm, preferably 70 to 130 lines/cm, more preferably 80 to 120 lines/cm; the latter resolution corresponding to a high-quality offset print. The invention takes into account, secondly, the requirement to avoid visually conspicuous markings on the document or package and, thirdly, proposes verification procedures for the images to be protected, which can be carried out using a smartphone or similar device. The solution of the task is based on a feature of the Raster Image Process (RIP) management at the end of the prepress stage, which can include the provision of the data for the platesetter or for the printing units. The terms Computer-to-Plate and Computer-to-Press (both abbreviated as CtP) have become established for the direct control of the platesetter or the printing units.

All created pixel and vector graphics as well as fonts are converted to halftone dots in the course of the halftone image process. The equivalent of a gray or halftone is color coverage on the print substrate. This is achieved by the size of the halftone dots (amplitude screening) or density of the halftone dots (frequency screening), the latter usually in the form of a stochastic dot distribution. Mixed forms of amplitude and frequency screening are not uncommon. Possible mixed forms are frequency screening in the low and bright tone range with amplitude screening for bright mid-tones or frequency screening with embedded amplitude-modulated halftone cells. In amplitude screening, the smallest printable dot is a halftone element, which in turn creates the visible halftone dot within a defined halftone cell together with other printable halftone elements. Provided that all halftone elements within a halftone cell are printable elements, the tone value is 100%, which corresponds to a solid tone. A lower tone value results in lighter tones, the gray or halftones. Halftone cells usually consist of halftone element arrays of 8×8 to 16×16 halftone elements, although these do not necessarily have to be square or rectangular, but can have a different shape depending on the screen angle or raster angle. A halftone cell of 16×16 halftone elements can therefore represent 254 shades of gray including the solid color, which does not meet the requirements of contemporary quality printing. A gray wedge usually consists of at least 1024 gray values, but can also contain more halftones, up to 4096 halftones. To meet the demand for a larger gray value spectrum, screening according to the pattern described above is supplemented by further RIP process steps. This includes the design of "halftone mountains" or "threshold mountains", which are an essential element of the present invention.

A gray value from the available spectrum of up to 4096 gray values (more values are theoretically possible) is stored in the raster memory for each raster element. A halftone element is characterized by the fact that it represents the smallest printing element, e.g. a laser dot of the laser illuminator, and has the property that it either prints, i.e. applies ink to the substrate, or does not print. For this reason, threshold values must be defined for the halftones or gray values above which a halftone element takes on color and thus has a printing effect or not. The sum of all threshold values of the halftone elements within the halftone cell forms—visualized—a "halftone mountain" or a "threshold value mountain", which describes a halftone dot shape for each gray value. The underlying threshold matrix may contain, for example, 128×128 halftone elements and consist of several halftone mountains. The halftone mountain can also be thought of as a piling up of halftone dots of decreasing size starting from the solid and ending with a single printing halftone element. Known halftone dot shapes are round, square-round, circular or ellipsoidal, which implies a more or less symmetrically shaped halftone mountain.

FIGS. 1A and 1B describe the first eight halftone levels of an 8×8 halftone cell. The tone value decreasing upwards is perceived by the unaided eye through the integration effect of the eye as an increasingly lighter grey tone, which is placed next to the drawings as an upwardly lighter grey wedge, whereby the planes at the same height lead to the same grey tone. The structure of the halftone mountain follows the rule that at least one printing halftone element is dropped from one halftone level to the next. Examples of halftone mounts with different geometries can be found in FIGS. 2A to 2C. In all three cases, a halftone cell size of 8×8 halftone elements was selected. FIG. 2D shows the grey wedge corresponding to FIGS. 2A to 2C. Together with halftone mounts of neighboring halftone cells, grey tones from a larger spectrum can be represented in the result. It can be seen that asymmetric halftone mounts with different grey tones can have very different halftone dot shapes. Sections through the halftone mounts at different grey tone values show the shape of the corresponding halftone dot. FIGS. 3A to 3K demonstrate the shape of the halftone dots as a function of the height of the sections through the halftone mountains, which are shown as a whole in FIGS. 2A to 2C. The halftone dot shapes of an asymmetrical halftone mountain in the form of a bar, an L or U shape, etc., which deviate from the usual symmetrical halftone dot shapes (round-square, round, ellipsoidal), while retaining the specified grey tone at the microscopic level, exhibit a characteristic pattern when viewed over many halftone cells, which stands quasi as a fingerprint for the original print. The original printed with such a print master naturally deviates from the print master, e.g. the lasered printing plate for offset printing, insofar as the printed dots appear expanded and blurred. The original retains its characteristic halftone dot pattern for grey values—in the range of 40 to 90%, preferably 50 to 80%. The halftone dot pattern thus generated in the medium to medium-light grey tone range provides the basis for the following authentication step. A scan of the original print and the printout of the scan result in a recognizable leveling of the halftone dot shapes so that the (illegal) copy no longer has the characteristic halftone dot pattern.

The basic colors of a color print are represented with different halftone angles in the usual Raster Image Process. The different colors of a multicolor image, e.g. cyan, magenta, yellow, black, spot colors, etc., are inserted in the printed image with different halftone angles in each case. FIG. 4 shows a representation of a partial image consisting of 16 halftone cells each with black color and an associated halftone angle of 45°, as occurs, for example, in the well-known halftone systems "RT classic" or "RT Y45 K fine". The designations for the various halftone systems are known to those skilled in the art. In contrast to the usual symmetrical halftone dot shapes, the different shades of gray in the example of FIG. 4 are generated by asymmetrical halftone dot shapes. The visually perceptible gray tone is also shown in this illustration. The gray tone is determined solely by the tonal value of the color, and in the example of FIG. 4, asymmetrical halftone dot shapes are used instead of the usual symmetrical, mostly round, halftone dot shapes. The corresponding gray tone of all three dot shapes shown can be generated with the same halftone mountain. However, it is also possible to define different halftone mountains in adjacent halftone cells, which would allow different halftone dot shapes with the same tonal value, i.e. the same gray tone. The same halftone process can of course be applied to any color channel. In the case where several color channels of the artwork are to have a modulation of the halftone dot shapes in the manner described, it is advantageous that in particular the associated halftone angles differ significantly from one another.

This means that not only monochrome original prints consisting of gray tones or halftones of a basic color of a color space or a special color, e.g. a specific pantone color, can be authenticated. It is also possible to represent two, three and more colors with an asymmetrical screening in the same print. In principle, a multicolor image of photographic quality can be generated in this way.

A halftone dot shape created in the halftone image process is not transferred to the printing substrate in the same geometric quality during printing due to various influences such as the flow behavior of the ink. However, the printed halftone dots are still of such quality that pattern recognition software can match the outlines of the halftone dots to the original. However, a scan of the original print and a subsequent printout leads to further deformation, which results in a completely irregular shape of the halftone dot. FIG. 5A to FIG. 5C show examples of halftone dots in the original print and on a copy. Authentication of the original is virtually based on the loss of the structural information stored in the form of halftone dot shapes in a large number of halftone dots. In principle, authentication can be performed at all locations in a printed image. Preference is given, however, to one or more predetermined zones, in which case the screening according to the invention need only be carried out in these zones. Image areas that are not intended for authentication can be screened using conventional methods. When selecting the authentication zones, it must be taken into account that especially significant changes in the halftones or gray tones lead to significantly different halftone dot shapes, provided that the same halftone mountain geometry is used for all half-tones or gray tones. Less desirable for the recognition of the halftone dot shapes are halftone gradients with a rather soft tone gradient. As an example, FIG. 6A shows a hard tone gradient with only four different tone values from right to left with decreasing tone value, and FIG. 6B shows a tone gradient with ten different tone values. It is easy to see that with a softer tone value gradient, the halftone dot shapes differ less significantly from one another. Thus, well distinguishable halftone dot shapes are spatially further apart. If a detection zone is placed on an area with very soft tone value gradients, the size of the detection zone must be selected so that a sufficiently large number of significant tone values can be evaluated for reliable copy detection. In practice, the selection of the location and size of a detection zone is an optimization question that must be answered individually for each image.

Detection of a micro-pattern thus created hidden in the grid is possible with suitable software and an image capture device such as a smartphone or tablet computer. As soon as a zone with asymmetric grid points is approximately detected by the smartphone's digital camera, a descriptor defined on the basis of the grid's microstructure performs verification in such a way that, in a first step, it guides the user to a suitable position for holding the smartphone using a visual aid, such as a superimposed frame on the smartphone's display. After the camera or smartphone is sufficiently well positioned, the descriptor implemented on smartphone can perform the second verification step for authenticating the print. The process flow is shown in FIG. 7.

The descriptor is essentially based on the halftone dot pattern located in the detection zone, but should be adapted to the printed dot pattern by means of a machine learning process in order to improve the reliability of the authentication. Deviations from the printed halftone dot pattern, which in the original print consist of e.g. bar-, L-, T- or U-shaped objects, are detected by the software and acknowledged with a negative authentication result if the deviation exceeds a certain geometrically allowed dimension. An (illegal) copy shows a clear deviation in the direction of an irregular round or potato shape even by way of a high-resolution scan and precise printing on a laser printer. Provided that the copy is produced with a print preceded by a separate halftone image process, halftone dots with regular shapes (squares, circles, etc.) are produced, but still deviating from the halftone dot shapes of the original. The difference between the copy and the original print can be made out with a high degree of reliability using a well-matched descriptor, but is limited by the resolution of the camera, the focus, and the movement of the smartphone. In other words, false authentication results are conceivable when using an inferior smartphone and/or due to camera shake and/or poor exposure. For the positioning step, i.e., aligning the smartphone, reference marks on the original print are not absolutely necessary, but they can be helpful in one application or another. In such cases, graphic markings such as a logo that are already present on the original print are preferable in order to satisfy the customer's request for a visually unchanged subject on the document or packaging. The individual process steps are outlined in FIG. 8A and FIG. 8B.

In principle, the procedure described above for raster-oriented tamper-evident detection can be extended over the entire image. However, the general case is the limitation to one detection zone, depending on the application also to several detection zones, where the area outside the zone has a standard raster. The transition of the standard raster (round, square-round, etc.) into the area of the asymmetric raster can be detected by the pattern recognition software, so that additional reference marks in the detection zone of the camera capturing the image are unnecessary.

Although the process according to the invention shows its advantages especially in the tamper-evident marking of colored images, it is of course possible to protect monochrome prints, e.g. made with black or a Pantone color.

Another application example is the coding of a two-color image preferably from two printing inks that are characterized by a larger difference in the halftone angle of 60° to 120°. For example, the "IS Classic" halftone system, which is characterized by a raster angle of 45° for magenta and 165° for cyan, is well suited for a double-coded two-color system. With values around 90°, the geometry of the halftone mountain of both colors should differ. However, this is not necessarily necessary. With the two-color variant, it is possible in principle to code either only one of the colors with asymmetrical screening or also both colors.

The application case of coding images with further colors is not only possible, but the particular advantage of the method according to the invention. It is advisable in halftone oriented coding according to the present invention in the case of a multi-color image to code only one color, preferably the topmost color or the color applied by the last printing unit. The reason for this is that increasing complexity due to a large number of halftone dots, some of which lie on top of each other, could make pattern recognition more difficult or more unreliable.

The principle of asymmetrical screening or rasterization can be implemented in all known halftone systems. The usual screening systems such as IS Classic, IS Y fine, IS Y60, IS Y30, ISCMYK+7.5°, the rational screening systems RT Classic and RTY45 K fine, 7-color printing and Hexachrome can all be coded with the method according to the invention, although in practice a limitation of the complexity should be taken into account. For example, in the case of 7-color printing with the HiFi-Color screening system, the color black would preferably be selected for encoding.

Of course, monochrome and multicolor areas can occur in an image. This is the case, for example, when a certain color that has been specified by a company's CI regulations, such as Pantone 7742 C, appears as the background color of a sales package and images from the CMYK color space are embedded in it. Such a case, of course, allows the encoding of both the background color and a color of the embedded image.

The method according to the invention is based on different halftone dot shapes depending on the halftone of the halftone-coded color. If one wanted to realize different halftone dot shapes for an essentially monochrome surface, i.e. a surface which is essentially dominated by a single halftone, this would be possible by defining asymmetric halftone mounts of different geometry within the detection zone. In this way it can be achieved that for a certain halftone, e.g. a medium-light gray, the halftone dot shapes appear partly in bar shape and in T-shape.

If several asymmetric raster peaks of different geometry are used, it is possible to have them appear in neighboring cells according to a certain pattern, e.g. alternating or stochastically distributed in each raster line. Of course, when using multiple detection zones, raster mountains can be defined specifically for each zone.

The representation of halftones via the size of halftone dots is known as amplitude screening. The classical frequency screening with halftone dots of small size in different density (different frequency) is not transferable to the method described here. However, the method according to the invention can be carried out with a hybrid screening. A common embodiment uses frequency screening for deep and light color tones or gray tones and amplitude screening in the mid-tone range, which has advantages in this range both in terms of lifelike image reproduction and for the coding according to the invention. A mixed form is also conceivable, in which larger and smaller halftone dots are mixed to represent a color tone. This is recommended when a very accurate hue progression is to be represented. The method according to the invention is also applicable to this type of screening.

The evaluation is preferably performed using a smartphone or a mobile device with similar characteristics, e.g. a tablet computer. Essentially, this is a device with an image capture unit, typically a smartphone camera, a display and the technical possibility to run software for authentication. Instead of the camera, a connected digital microscope can also be used for image capture. A connection to the Internet is not necessarily required, but is advantageous in order to cover the entire scope of all use cases and to parameterize the software itself, the descriptor or the display of the authentication result. In principle, the connection to a server via the Internet can be accomplished using all known methods, such as LAN, WLAN, LTE, Bluetooth, etc.

Smartphones can be easily adapted to different use cases by installing application programs on the device as so-called apps, which in turn access locally stored data and/or data from a server or an external database. Thus, the descriptor can be stored both on the device and on an external server. If the descriptor is stored on the device, the app also accesses the server for the recognition of the halftone point shapes if the descriptor on the device side needs to be updated. The updated version of the descriptor is then parameterized in such a way that the detection area in a specific image of a document or packaging can be analyzed by means of pattern recognition.

The user of the method only needs to know the detection zone approximately. After activating the app, the exact positioning of the smartphone is determined by a detection frame that is superimposed on the device's display, for example. Guidance instructions to the user can also be given via an acoustic address, as is known in communication with artificial intelligences. As soon as the smartphone is in a position suitable for authentication, a visual or acoustic acknowledgement is transmitted to the user. The image analysis can then take place without delay or be started via an input from the user. Immediately thereafter, the authentication result is transmitted to the user, for example with the remark "original" or "copy", or by light signals with red=copy or green=original. Of course, verbal messages are also conceivable. The form of transmission of the authentication result can also be in a restricted form. For example, a message can be issued to a consumer as a user that the authentication was successful and the original was recognized. On the other hand, at the expert level, which is protected by a password, for example, the result is communicated in a much more detailed form, e.g., with an indication of the statistical quality.

Another variant consists of an evaluation on a server that is connected to the mobile device. In this case, the application program on the mobile device is synchronized with the server and parameterized online. This version allows the evaluation to be performed on the server and the result to be sent back to the mobile device in a user-specific manner. The server can host different publisher-specific program versions for the application, and downloading and installation can be performed by authorized persons. Accordingly, the application program is specified for authenticating documents or a selection of documents from a publisher and is directed to specific user groups, e.g., consumers, publisher's personnel, etc., although the functionality of the application program can be freely adapted to the type of use.

Reference marks in the detection range of the camera are helpful for the reliability of authentication, but not absolutely necessary. Lines of a logo or significant halftone lines caused by sharp edges in the subject are generally sufficient. Such geometric structures are particularly advantageous if they are printed with the same color as the halftone encoded according to the invention.

BRIEF DESCRIPTION OF THE DRAWINGS

Preferred embodiments of the invention are described below with reference to the drawings, which are for explanatory purposes only and are not to be construed restrictively. Shown in the drawings:

FIG. 2A a raster/halftone mountain consisting of 64 raster/halftone planes with raster/halftone dots getting smaller towards the top indicating non-exposure;

FIG. 2B a halftone mountain as shown in FIG. 2A, but with halftone points becoming smaller asymmetrically towards the top;

FIG. 2C a halftone mountain as shown in FIG. 2A or FIG. 2B, but with the halftone dot assignment changing asymmetrically upward in various ways;

FIG. 2D a gray wedge or halftone wedge 5 corresponding to the halftone cell planes according to FIG. 2A, FIG. 2B and FIG. 2C;

FIGS. 3D, 3E, 3F and 3G show, on the one hand, the raster mountain according to FIG. 2B in four cut parts on the left side and a view of the raster plane with black colored raster cells of the exposed elements of the uppermost raster plane of the assigned section;

FIGS. 5A, 5B and 5C each show, on the left, a predefined halftone dot specified for exposure, which has changed, in the representation in the center as a printed object, into a visually related object. After a scan and subsequent printout of the scan, the halftone dots shown on the right result with significant deviations from halftone dots detectable in the original printed object;

FIGS. 8A & 8B show an exemplary representation of an authentication performed according to the invention following control instructions by a control program installed on a smartphone starting from the start of the same via the touch screen to the display of the authentication result on the same.

DESCRIPTION OF THE INVENTION

Figure 1A:
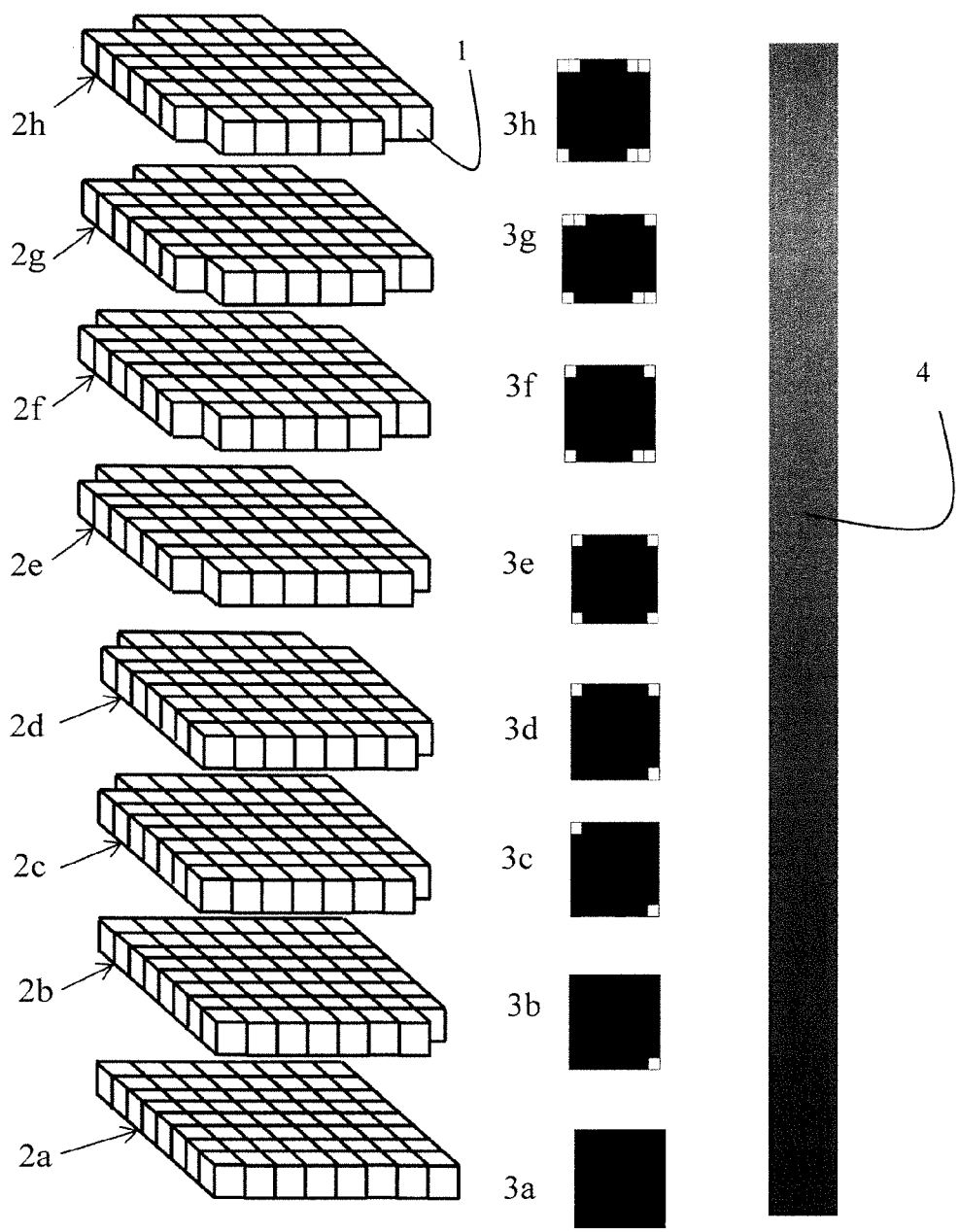
FIG. 1A a sequence of eight halftone cell planes at the base of a halftone mountain with a specific exposure plane sequence, the overhead view of each plane of the halftone dot, and a corresponding gray wedge or halftone wedge across the eight halftone cell planes.

FIG. 1A shows a sequence of the first eight halftone cell levels 2a to 2h at the base of a halftone mountain consisting of 8×8 halftone cells 1. The lowest level 2a represents the largest possible halftone dot with here 64 exposed halftone elements. The halftone dot, labeled 3a, thus has a complete 100% tone value of the color and is shown opposite. The uppermost eighth halftone level 2h consists of 57 exposed halftone dots, corresponding to a tone value of the halftone dot 3h of 89%. In between here are six further halftone levels 2b, 2c, 2d, 2e, 2f and 2g with 63 to 58 exposed and thus black halftone elements. This then includes the halftone dots 3b, 3c, 3d, 3e, 3f and 3g with a non-exposure of all halftone elements near the corners. Next to this sequence of halftone cell planes, a corresponding gray wedge or halftone wedge 4 is shown for the halftone cell planes. This corresponds to the known amplitude modulated approach, where different tone values are represented by different planes.

Figure 1B:
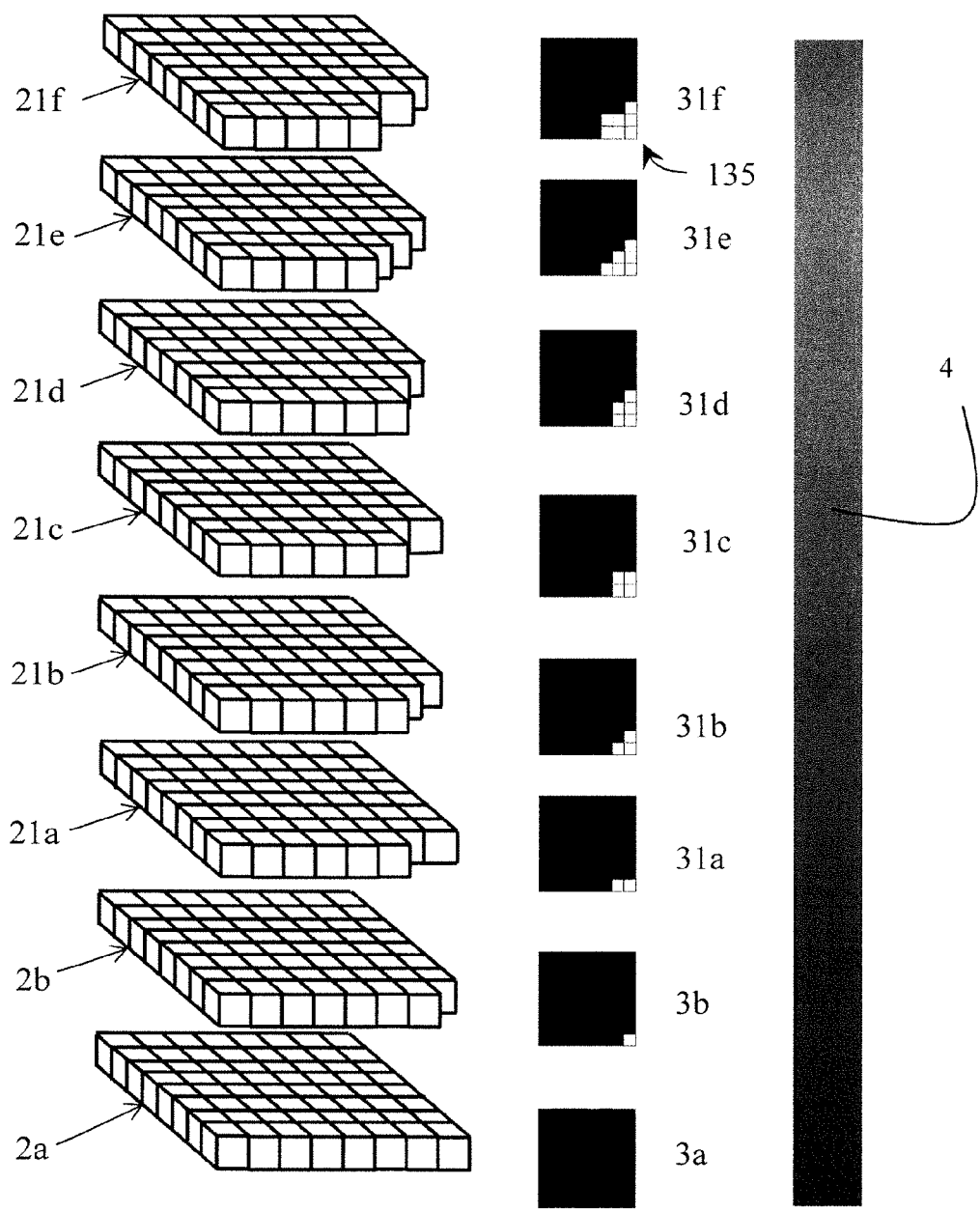
FIG. 1B a sequence of eight halftone cell planes at the base of a halftone mountain with a specific exposure plane sequence different from FIG. 1A, the overhead view of each plane of the halftone dot, and a corresponding gray wedge or halftone wedge across the eight halftone cell planes.

FIG. 1B shows another sequence of the first eight halftone/raster cell levels at the base of a halftone/raster mountain consisting of 8×8 halftone/raster cells 1, but with exposure of the halftone elements at other locations in the halftone cell. Thus, the lowest halftone cell 2a is again fully exposed and corresponds to plane 2a of FIG. 1a. However, since the individual halftone planes are exposed in a different sequence, the shape of the halftone dot on the highest plane 21f is different, but the tonal value of 89% and thus the halftone remain the same, as shown by the corresponding gray wedge or halftone wedge 4 to the halftone cell planes, which is identical to FIG. 1A.

Between these planes, which are identical in gray tone, there are here six further halftone planes 2b, 21a, 21b, 21c, 21d and 21e with 63 to 58 exposed and thus black halftone elements. In each case, the non-exposed halftone elements in the lower right corner 135 have been left unexposed, so that then the halftone elements 3b, 31a, 31b, 31c, 31d and 31e remain with a substantially lower right light area, while all other three halftone element areas near the corners are exposed and shown in black.

FIG. 2A shows a halftone mountain consisting of 64 halftone planes with halftone dots that become smaller towards the top, whereby a centrally symmetrical exposure with a central halftone cell area 136 is provided, as is the case for a typical prior art printed image. Reference numerals 6, 7 and 8 relate to three plane regions of the halftone mountain, which are then described in greater detail in FIG.

3A. Typically, halftone mounts are designed to produce square round, round, diamond or ellipsoidal halftone dots.

FIG. 2B shows a halftone mountain as shown in FIG. 2A, but with halftone dots becoming smaller asymmetrically towards the top. The exposed halftone cells or halftone elements tend towards a corner with increasing exposure, in this case the halftone cell corner area 137. Reference numerals 12, 13, 14 and 15 refer to four plane areas of the halftone mountain, which are then described in greater detail in FIG. 3A.

FIG. 2C shows a halftone mountain as shown in FIG. 2A, but with the halftone dot assignment changing asymmetrically in various ways towards the top, with the exposed halftone cells forming a U-shaped halftone dot 138 at mid-height and approaching the T-shape as halftone dot 139 towards the top. Further up, in the last levels before the peak 141 located at one, here the rear, side edge, a bar-shaped halftone dot 140 is formed. The reference signs 12, 13, 14 and 15 refer to four plane areas of the raster mountain, which are then described in greater detail in FIG. 3A.

FIGS. 2A, 2B and 2C, although shown independently of each other, are united by the corresponding gray wedge or halftone wedge 5 to the halftone cell planes shown in FIG. 2A, FIG. 2B and FIG. 2C on the same drawing sheet next to them in FIG. 2D. In other words, the tone value is the same for the corresponding height of the corresponding plane of the halftone mountain, so the halftone dot appears the same to the observer, as will be explained later in connection with FIG. 4.

Figure 3A:
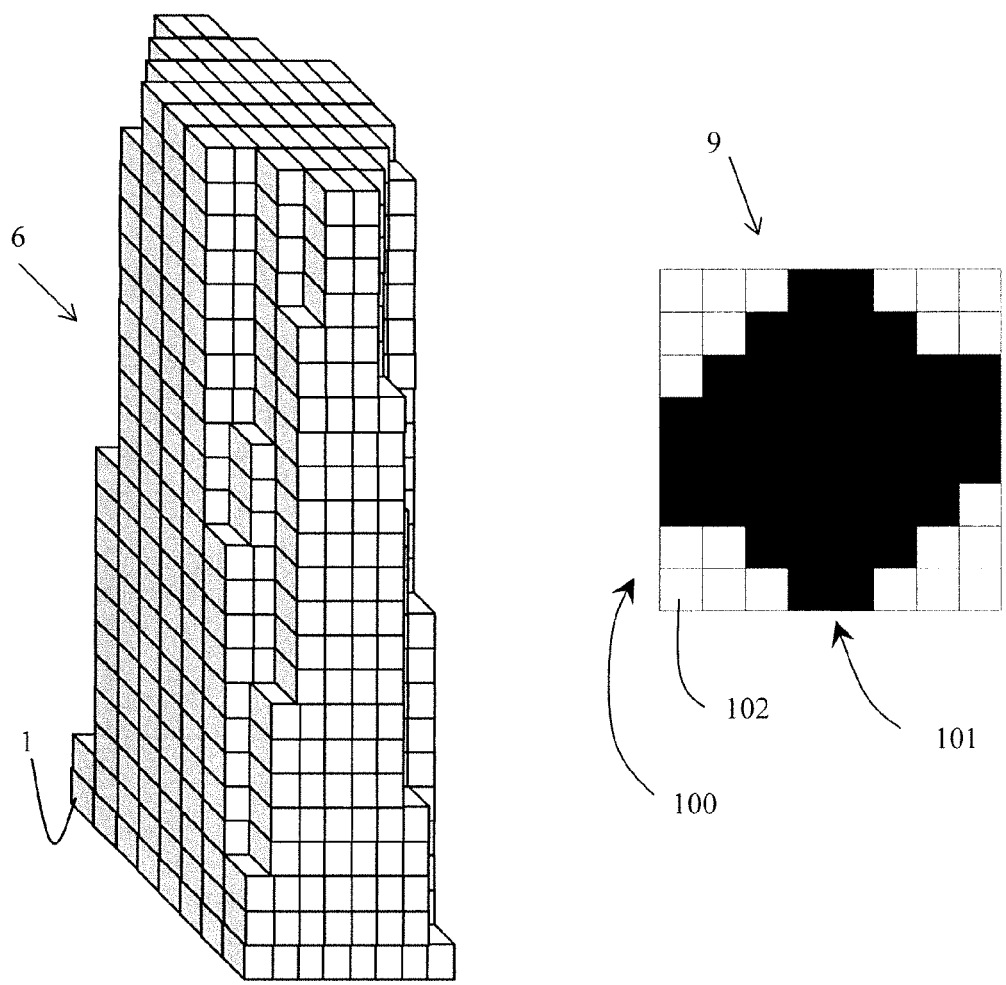
FIGS. 3A, 3B and 3C show, on the one hand, the raster mountain according to FIG. 2A in three cut parts on the left side and a view of the raster plane with black colored raster/halftone cells of the exposed elements of the uppermost raster plane of the assigned section.
Figure 3B:
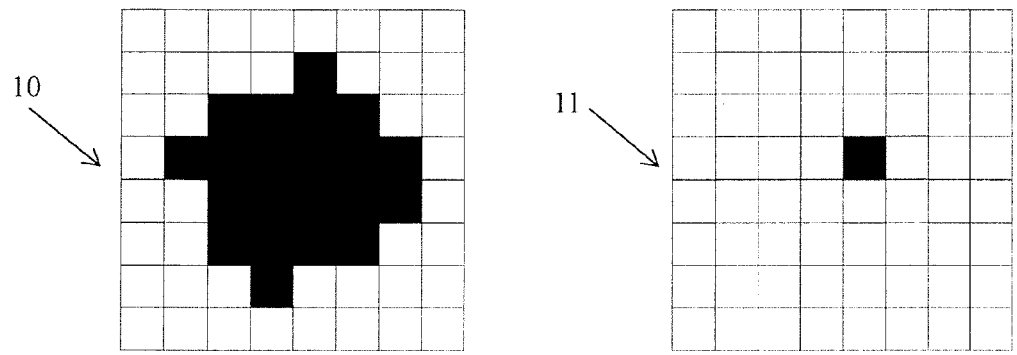
Figure 3C:
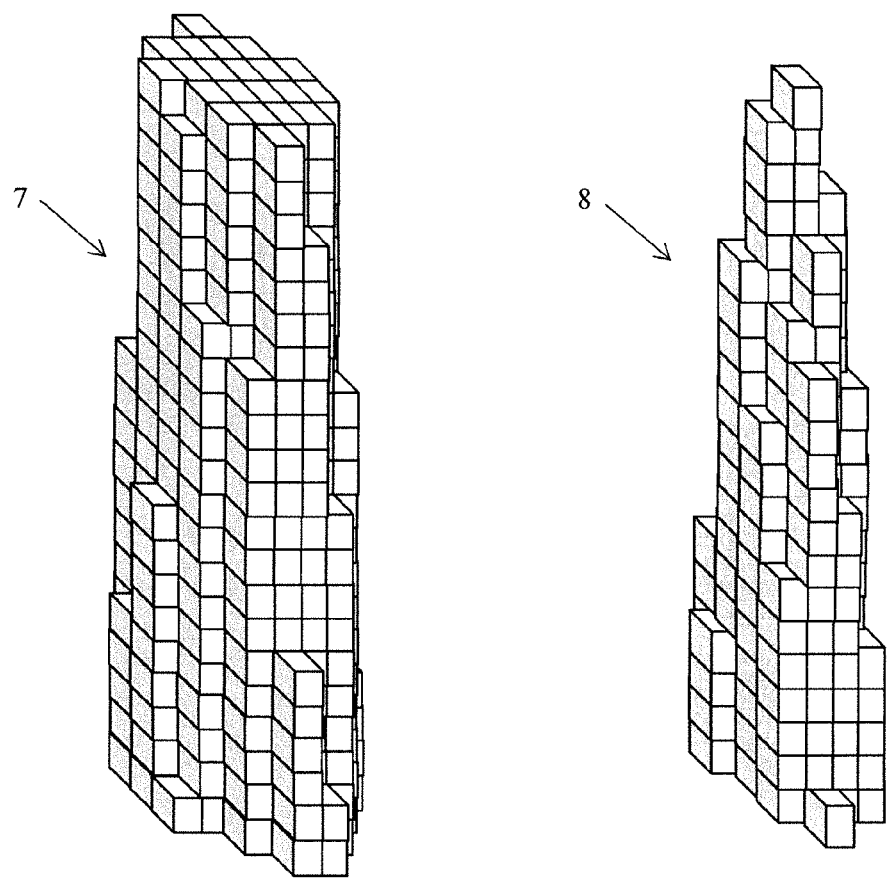

FIGS. 3A, 3B and 3C show, on the one hand, the halftone mountain 1 according to FIG. 2A in three cut parts 6, 7 or 8 on the left and a view of the halftone plane 9, 10 or 11 with black colored halftone elements of the exposed elements of the uppermost halftone plane of the associated section 6, 7 or 8 on the right. The bottom section 6 covers a tonal range from 100% to about 66%, the middle section 7 from 66% to 32%, and the top from 32% to 2%. The respective uppermost halftone planes 9, 10, 11 have a more or less symmetrical shape compared to each other. The bottom plane 6 represents a raster cell 100 with 8×8 raster elements 102. In this raster cell 100, some raster elements are now "printed" or exposed and thus form the raster dot 101, which is shown here in black. Here, black can stand for any color in the given printing color space, including black on a white/bright background or vice versa.

FIGS. 3D, 3E, 3F and 3G show, on the one hand, the halftone mountain 1 according to FIG. 2B in four cut parts 12, 13, 14 and, 15, respectively, on the left side and a view of the halftone plane of the associated section 16, 17, 18 and 19, respectively, on the right side. The lowest section 12 covers a tonal range of 100% to about 69%, the lower middle section 13 covers a tonal range of 70% to 44%, the upper middle section 14 covers a tonal range of 43% to 16%, and the top section 15 covers 15% or less. The respective uppermost halftone planes 16, 17, 18 and 11' have the shape of a corner, which can also be seen as a diminishing triangle. For the middle upper plane 14, it can now be clearly seen that for the raster cell 100 with its 8×8 raster elements 102, there are now some raster elements printed asymmetrically with respect to the center, thus forming the asymmetrically printed raster dot 101.

FIGS. 3H, 3I, 3J and 3K show, on the one hand, the halftone mountain according to FIG. 2C in four cut parts 19, 20, 21 and 22 on the left and a view of the halftone plane of the associated section 23, 24, 25 or 11" on the right. The lowest section 19 covers a tone value from 100% to about 70%, the lower middle section 20 covers a tone value from 69% to 37%, the upper middle section 21 covers a tone value from 36% to 25%, and the top 22 covers a tone value of 24% or less. The respective uppermost halftone planes 23, 24, 25, 11" have shapes which develop from a circle open on the left, i.e. a U-shape 23, via a T-shape 24 of the halftone elements 102 of the plane to a bar 25 or a single exposed halftone element 102 as a decentralized halftone dot 11". The bar 25 is located at a side edge 150 of the halftone cell 100 Essentially, at least for a predetermined number of tone values, a predetermined shape of the printed screen dot deviating from usual point-symmetrical or axis-symmetrical shapes.

Figure 4:
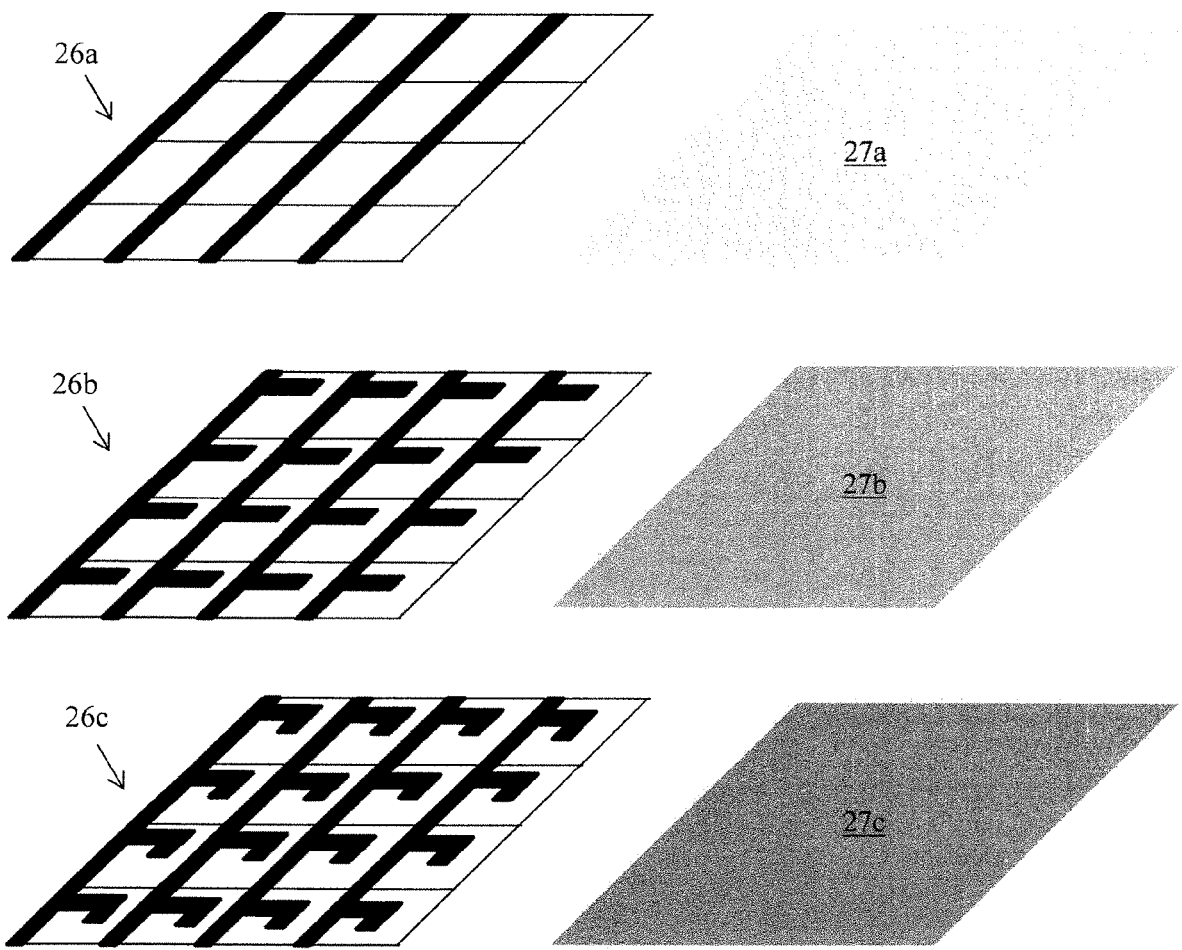
FIG. 4 shows on the left, one above the other, three halftone tiles each consisting of sixteen halftone cells with the same halftone cell exposure but different exposure in each halftone tile, the halftone tiles being characterized by an increasing tone value from bottom to top, also shown one above the other on the right.

FIG. 4 shows three halftone tiles 26a, 26b and 26c, each consisting of sixteen halftone cells, one above the other in a spatial representation, which are characterized by an increasing tonal value from halftone tile 26a to halftone tile 26c. At the same time, the halftone dots differ significantly in shape. For example, the individual halftone dots of halftone tile 26a are a continuous line on the left edge of the respective halftone dot, from which a downwardly directed hook protrudes as an exposed area. The individual halftone dots of the halftone tile 26b consist of a continuous line at the left edge of the respective halftone dot, from which a line ending in front of the opposite edge is exposed in the upper third of the halftone dot. The individual halftone dots of the halftone tile 26b comprise a continuous line at the left edge of the respective halftone dot, from which a line ending before the opposite edge is exposed in the upper third of the halftone dot. The individual halftone dots of the halftone tile 26c then consist only of a continuous line at the left edge of the respective halftone dot. The gray areas 27a, 27b and 27c next to it on the right side of FIG. 4, which are also superimposed, symbolize the perceived halftones or gray tones correspondingly from dark to light, seen from bottom to top.

FIG. 5A shows on the left a predefined halftone dot 28a executed as a line and predefined for the exposure. Here, predefined means defined as electronic data for, for example, pixel-by-pixel laser exposure. This definition is then here the definition of a color in multicolor printing, preferably the top color. This results in a visually related object after printing, symbolized by the arrow 160, which will have a slightly different shape 29a due to the specifics of printing such as ink, substrate and machine parameters, to name a few. A copy made from this printout, i.e., a scan followed by a printout of the scan, will have deviations from the halftone dots printed in the original, which can be detected using machine pattern recognition. The cause of the halftone dot shapes of the copy 30a lie, for example, in inaccuracies of the scan, a renewed color separation and a repeated halftone image process in the printing of the then copied printout, all these factors which can be subsumed under copying errors being represented by the arrow 170.

FIG. 5B shows a (lying) L-shaped halftone dot 28b and FIG. 5C shows a hook-shaped halftone dot 28c. The deviations during printing explained for FIG. 5A occur here as a lying printed L 29b and as a printed hook 29c, respectively, whereby then with a scan and a subsequent print copy 30b and 30c, respectively, even further differences arise which can be detected with a pattern recognition.

Figures 6A, 6B:
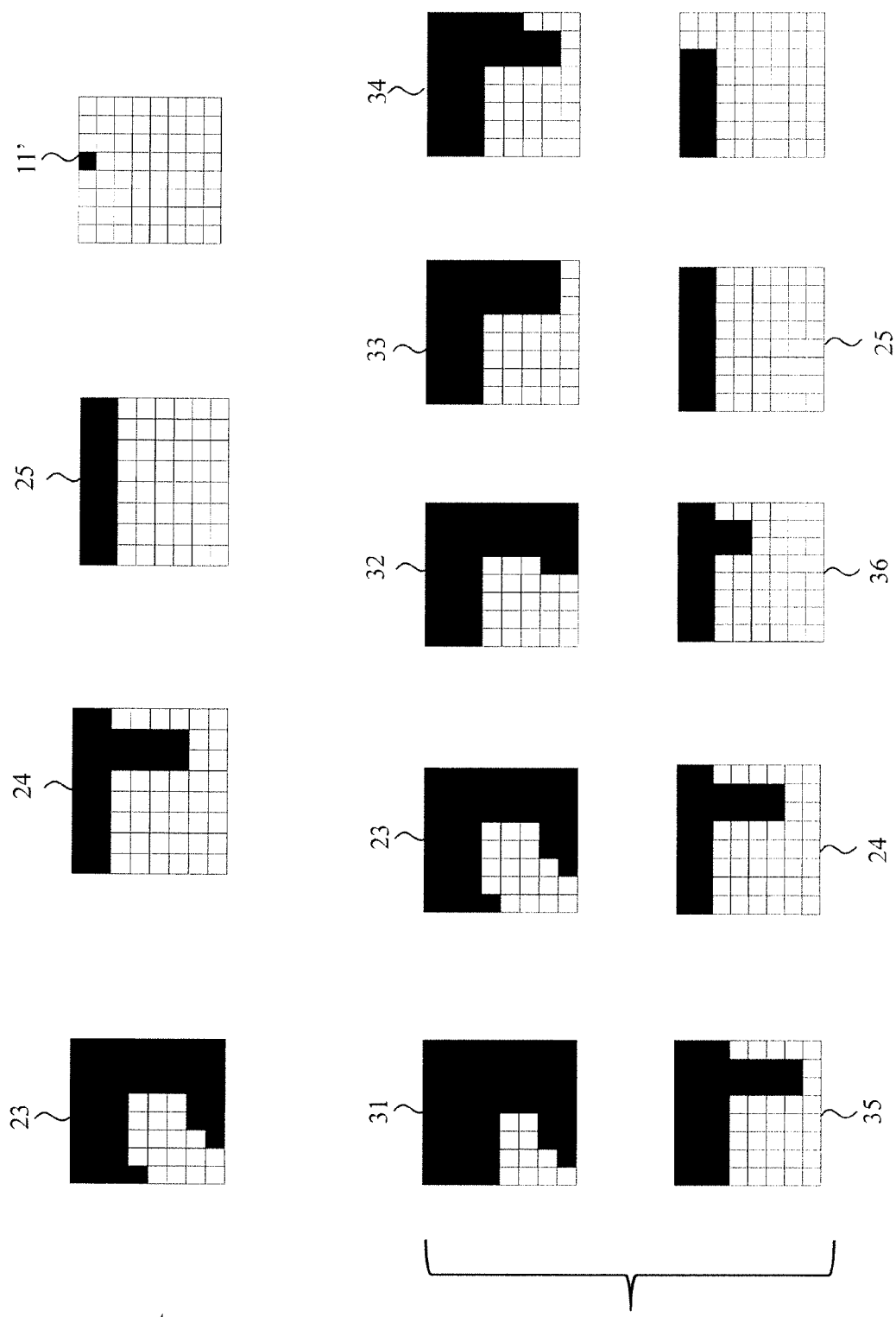
FIGS. 6A & 6B show a sequence of four and 10 distinct halftones, respectively, getting brighter from left to right and accompanied by a distinctly changing halftone dot shape.

FIG. 6A shows a sequence of four clearly distinguishable halftones. The tone becoming brighter from left to right is accompanied by a clearly changing halftone dot shape 23, 24, 25 and 11', respectively.

FIG. 6b shows a sequence of ten halftones that are distinct from each other. The tone, which becomes brighter as it is shown from left to right in two rows, is accompanied by a changing halftone dot shape 31, 23, 32, 33, 34, 35, 24, 36, 25 and 37.

These are predetermined halftone dot shapes corresponding to a known symmetrical tone value, whereby in the detection zone these halftone dot shapes replace the usual shapes. Different asymmetric halftone dot shapes with the same tone value can also be provided in different areas of a detection zone, or these are defined as different, i.e. two or more detection zones. In this case, these halftone mountain geometries are predetermined and the assigned plane (height) is defined in its corresponding tone value.

Figure 7:
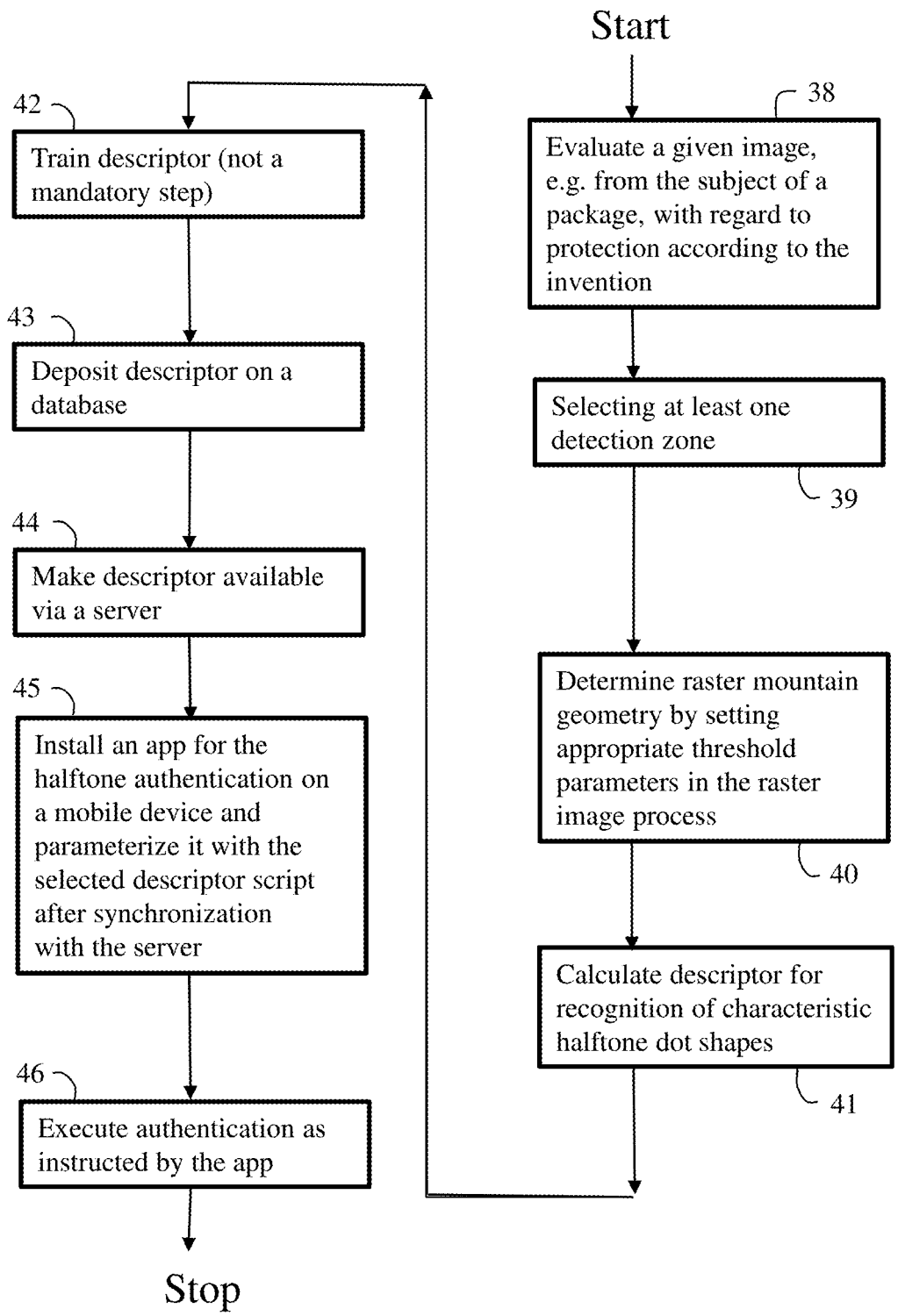
FIG. 7 a block diagram of a process representation of the encoding of the halftone dots up to the verification of the encoded halftone dots, starting from the provision of a first image to the evaluation of the optimal image sections for the intended encoding according to the invention, up to the authentication of the original print according to the instructions of a dedicated application program.

FIG. 7 shows a block diagram of a process representation of the encoding of the halftone dots up to the verification of the encoded halftone dots, starting from the provision of a first image for the evaluation of the optimal image sections for the intended encoding according to the invention 38 up to the authentication of the original print according to the instructions of a dedicated application program 46.

It is assumed that for the printing area in a detection zone of an image on a package, the RIP process has been modified according to the invention. In this case, the halftone peaks have been designed in a decidedly and deterministically predetermined asymmetrical manner, so that these have been implemented in the printing process in accordance with the halftones to be printed. The modifications leading to a coding have been made in such a way that the print coverage of the corresponding color of the print coverage corresponds to the rest of the normal print image. Thus, there is a printed product, for example packaging, on which at least a part of the image, namely the part that lies in a detection zone, has been modified in relation to the RIP process in accordance with the invention. Several detection zones with different print occupancies can be provided.

This print image available to the user, which was created by printing according to arrow 160 in FIG. 5, can now be an original or a copy, whereby a copy is usually characterized by the fact that someone has photographed or scanned an original, i.e. according to arrow 170 in FIG. 5, in order to create a data set which is intended for printing a copy of the print image.

The process sequence shown in FIG. 7 is divided into a design phase, which comprises all process steps up to and including printing and definition of the descriptor, and the actual authentication phase, which comprises all actions of the user to accomplish authentication of the original print. During this phase, an electronic print template is generated with the halftone dots modulated according to the invention. Then, after printing, a predetermined image 38 is available, for example from the subject of a package, to be evaluated in terms of protection according to the invention. This subject can be assigned one or more detection zones 39, i.e. one or more areas in which the CtP process has been modified according to the invention. Of course, the detection zone can also comprise the entire subject.

In the next step 40, the halftone mountain geometry is determined by setting suitable threshold parameters in the halftone image process. This means that the dot shape to be applied to the original and thus to be printed is determined for a large number of halftone dots. This is not, as is usual with the amplitude-modulated halftone process, a symmetrical mapping of the halftone dot as in FIGS. 1A and 1n the representation for three color halftones in FIGS. 3A, 3B and 3C, but deterministically specified a clearly asymmetrical mapping, so that halftone dots 16 are detected for a darker color tone and halftone dots 17 or 18 for a lighter color tone.

Figures 3F, 3G:
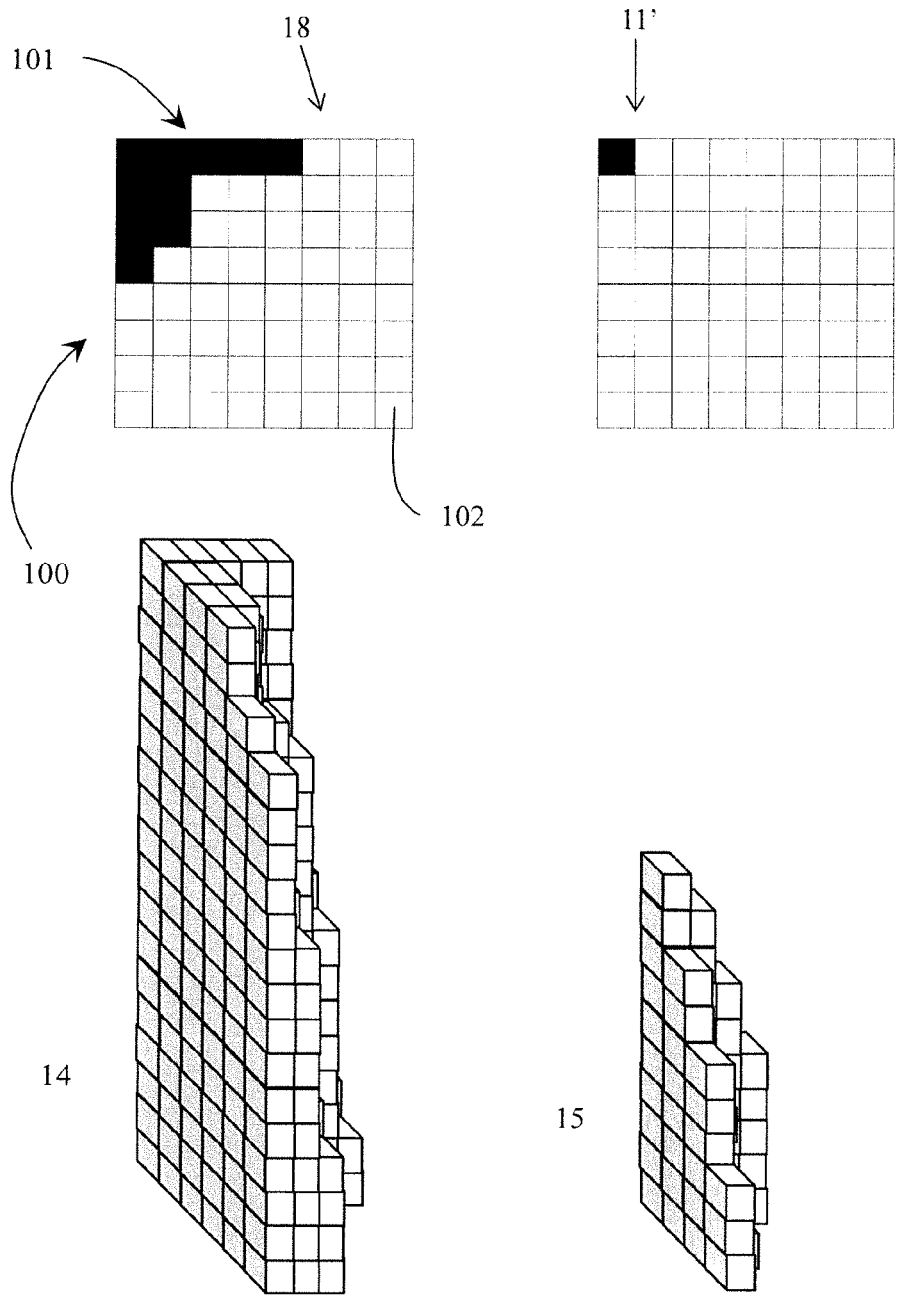
Figures 3H, 3I:
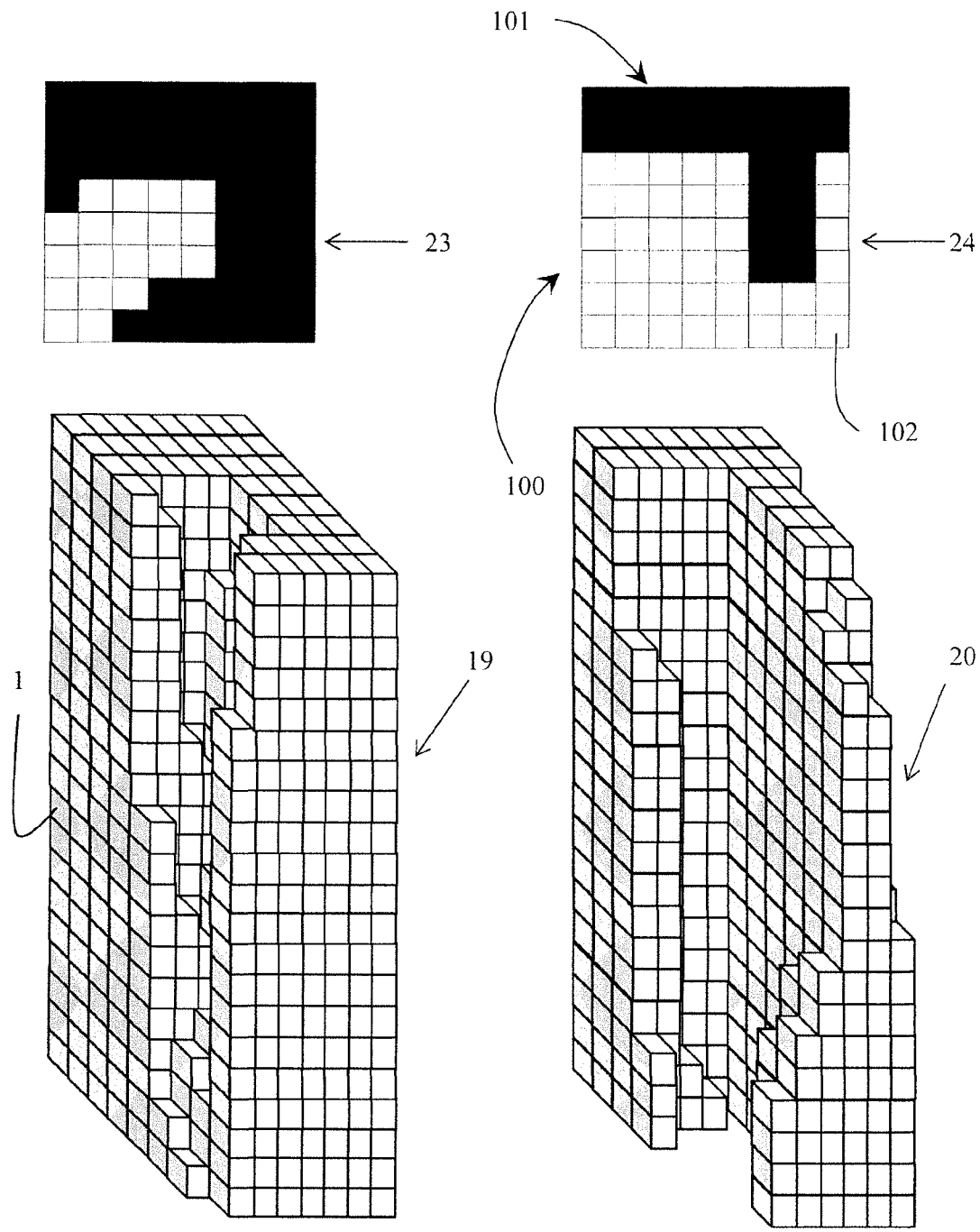
FIGS. 3H, 3I, 3J and 3K show, on the one hand, the raster mountain according to FIG. 2C in four cut parts on the left side and a view of the raster plane with black colored raster cells of the exposed elements of the uppermost raster plane of the assigned section.
Figure 3J:
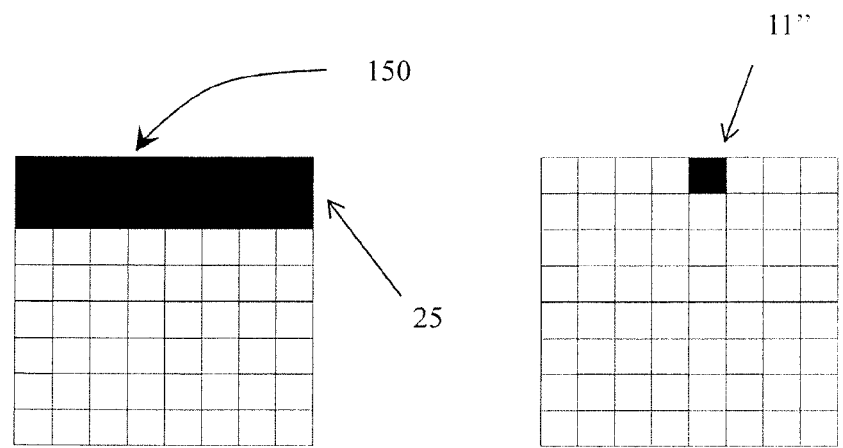
Figure 3K:
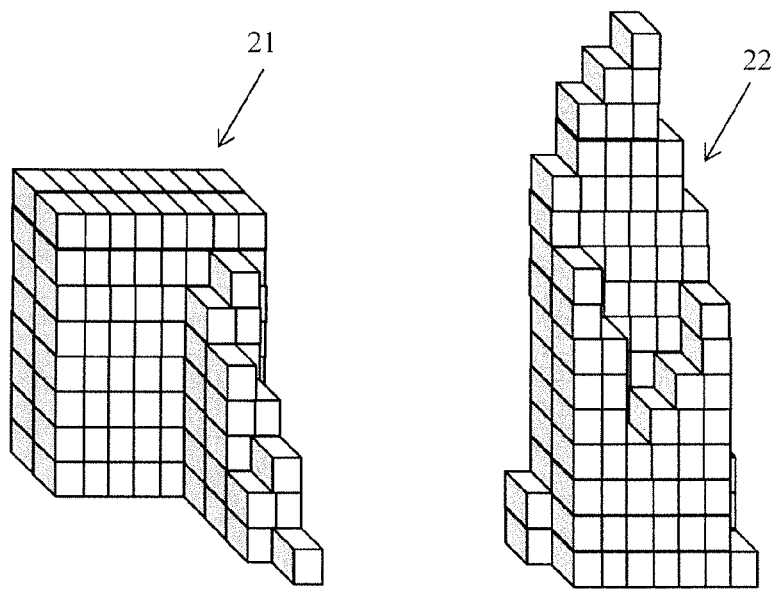

Now, the halftone dots 16, 17 or 18 to be detected are not optimal dots as shown in FIG. 3D, 3E or 3F, but are of poorer quality as indicated in FIG. 5A to FIG. 5C for print images 29a, 29b and 29c, but not as poor as print images 30a, 30b or 30C indicate.

For this purpose, in the method, in a step 41, a descriptor for the recognition of these characteristic halftone dot shapes is calculated and made available for authentication. The descriptor is a pattern recognition algorithm adapted to the pattern consisting of the halftone dot shapes. Descriptors can be predefined or are predefined and are adapted with regard to printing techniques used, printing papers, etc., whereby one speaks of training, whereby EP 2 921 989 A1 shows a possible procedure.

The descriptor can be trained and better matched to the sample in a further step 42, which is not a mandatory step, but beneficial to increase the reliability of the authentication. Training can be based either on original prints, e.g., galley proofs, or on print-typical image changes due to ink and paper properties, printing processes, and machine-typical influences. Following step 41 or 42, the descriptor is stored in a database in a storage step 43 and made available to the process control program via a server in a provision step 44.

The following steps serve to prepare the mobile device for authentication and authentication itself. For this purpose, the user has installed an application program 45 for raster authentication according to the invention on a mobile device and, after synchronization with the server, has parameterized it with the selected descriptor script and, in an authentication step 46, performs the necessary comparison according to the instructions of the application in order to decide whether the photographed detection zone is an original or a copy.

Figure 8B:
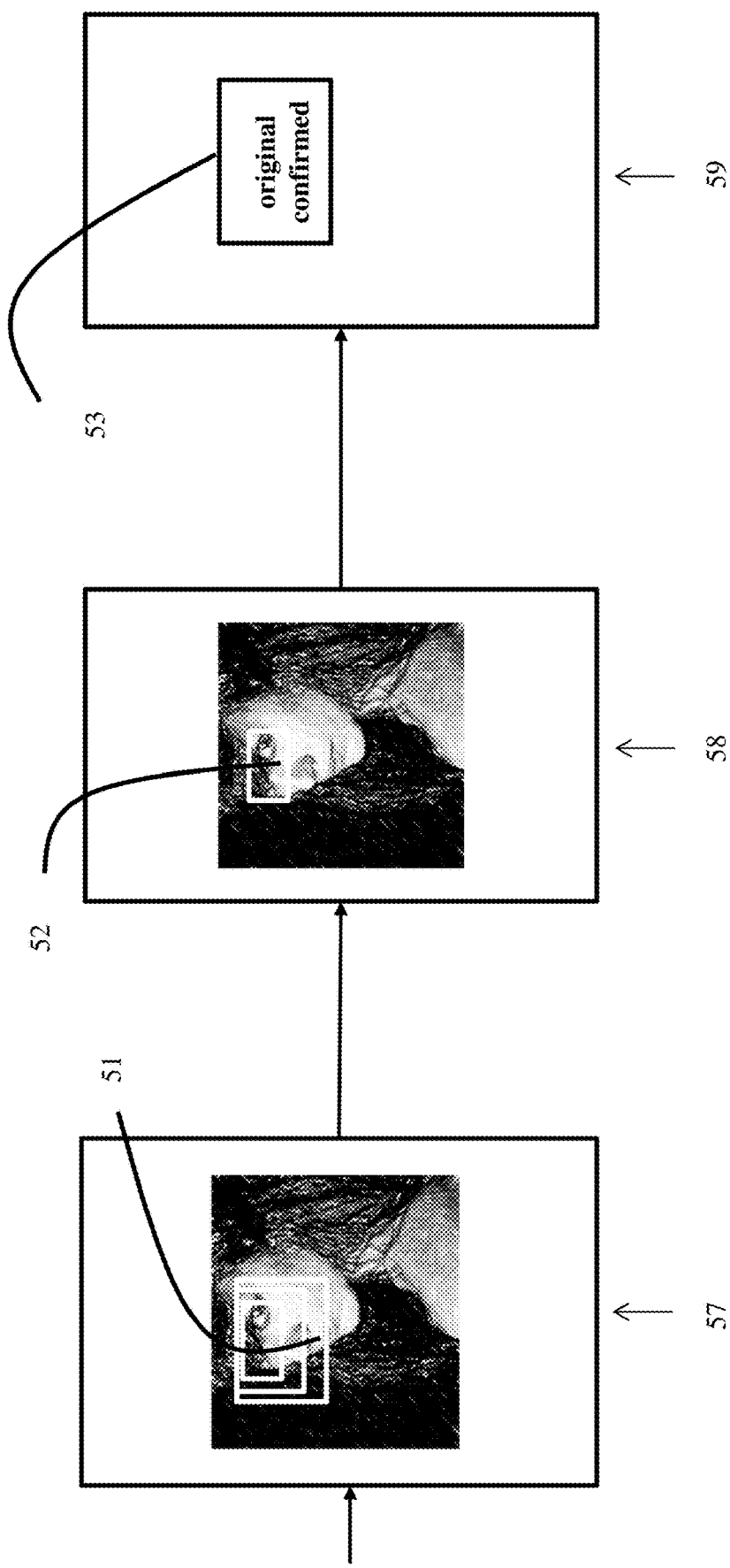

FIG. 8A, followed by FIG. 8B, shows an exemplary representation of an authentication carried out in accordance with the invention according to control instructions by a control program installed on a smartphone starting from the start of the same 48 via the touch screen 47 up to the display of the authentication result on this touch screen 47 as an output unit. The start occurs by touching the corresponding icon 48 on the display 47 of the mobile device in step 54, which may be a tablet computer in addition to a smartphone, until the authentication result 53 is displayed in the last step 59. In between, a display of the image data 49 taken with the camera of the portable portable communication device is switched on the screen in a preselection step 55. This may be followed by the pre-setting of a rough visualization frame 50 in a selection step, where a guiding symbol 51 shifts the section to a detection zone 52 or, better, encourages the user to take an enlarged image of this section in a shifting step 57. The usual aids such as autofocus or zoom are possible here. It can also be provided that the control program allows several detection zones 52 to be approached, i.e. steps 56 to 58 are repeated several times with different detection zones 52. Essential is the recording of the detection zone 52 from an image section which then has a matrix of image points corresponding to the CCD or image sensor, which in a comparison step 59 are viewed either close to the original printed images 29a, 29b or 29c of the predefined halftone dots or rather the printing of a copy of these after the images 30a, 30b or 30c, with which the authentication result is then displayed.

REFERENCE NUMERALS LIST

1 Raster element
2 Fully exposed raster cell (all raster elements are printing elements).

2*b* As 2*a*, but one raster element unexposed
2*c* As 2*a*, but two opposite halftone elements unexposed
2*d* As 2*a*, but with three unexposed halftone elements at the corners.
2*e* As 2*a*, but with four unexposed halftone elements at the corners.
2*f* As 2*e*, but with two unexposed halftone elements of one of the corners, thus with a total of five unexposed halftone elements.
2*g* As 2*e*, but with two unexposed halftone elements at each of the opposite corners, thus with a total of six unexposed halftone elements.
2*h* As 2*e*, but with two unexposed halftone elements at each of three corners, for a total of seven unexposed halftone elements.
3*a* to 3*h* Idealized shape of halftone points corresponding to planes 2*a* to 2*h*
21*a* As 2*b*, but two unexposed halftone elements at one corner, tone value as 2*c*
21*b* As 21*a*, but three unexposed halftone elements at one corner, tone value as 2*d*
21*c* As 2*b*, but four unexposed halftone elements at one corner, tone value as 2*e*
21*d* As 2*b*, but five unexposed halftone elements at one corner, tone value as 2*f*
21*e* As 2*b*, but six unexposed halftone elements at one corner, tone value as 2*g*
21*f* As 2*b*, but seven unexposed halftone elements at one corner, tone value as 2*h*
31*a* to 31*f* Idealized shape of the halftone points corresponding to planes 21*a* to 21*f*
4 Gray wedge corresponding to the adjacent rows of halftone point shapes 3*a* to 3*h* or 3*a*, 3*b*, 31*a* to 31*f*.
5 Gray wedge corresponding to the adjacent representation of threshold values for a successive decrease in the exposure of halftone elements (halftone mountain). The gray wedge spans the entire spectrum of gray tones from 100% tonal value (black) to 0% (white).
6 Symmetrical halftone mountain with a tone value from 100% to 66%.
7 Symmetrical halftone mountain with a tone value of 68% to 32%.
8 Symmetrical halftone mountain with a tone value of 31% to 1.6%.
9 The halftone dot shape of the uppermost halftone mountain 6 is characterized by twenty-two unexposed halftone elements, the outer shape being more or less symmetrical.
10 The halftone dot shape of the uppermost halftone mountain 7 is characterized by forty-three unexposed halftone elements, with the outer shape being more or less symmetrical.
11 The halftone dot shape of the uppermost halftone mountain 8 is characterized by sixty-three unexposed halftone elements or consists of a single exposed halftone element.
11' exposed corner element
11" exposed single side edge element
12 Halftone mountain with a tone value from 100% to 69%. The shape of the halftone mountain is asymmetrical.
13 Halftone mountain with a tone value of 70% to 44%. The shape of the halftone mountain is asymmetrical.
14 Halftone mountain with a tone value of 43% to 16%. The shape of the halftone mountain is asymmetrical.
15 Halftone mountain with a tone value of 15% to 1.6%. The shape of the halftone mountain is asymmetrical.
16 The halftone dot shape of the uppermost halftone mountain 12 is characterized by 20 unexposed halftone elements, the outer shape being asymmetrical with essentially one corner unexposed.
17 The halftone dot shape of the uppermost halftone mountain 13 is characterized by 36 unexposed halftone elements, the outer shape being asymmetrical with essentially one corner unexposed.
18 The halftone dot shape of the uppermost halftone mountain 12 is characterized by ten exposed halftone elements, the outer shape being asymmetrical with substantially one corner exposed.
19 Halftone mountain with a tone value from 100% to 70%. The shape of the halftone mountain is strictly asymmetrical.
20 Halftone mountain with a tone value of 69% to 37%. The shape of the halftone mountain is strictly asymmetrical.
21 Halftone mountain with a tone value of 36% to 25%. The shape of the halftone mountain is strictly asymmetrical.
22 Halftone mountain peak with a tone value of 24% to 1.6%. The shape of the raster mountain is strictly asymmetrical.
23 The halftone dot shape of the uppermost halftone mountain 19 is characterized by nineteen unexposed halftone elements, the outer shape being strictly asymmetrical and essentially unexposed in the center and at one corner.
24 The halftone dot shape of the uppermost halftone mountain 20 is characterized by twenty-four exposed halftone elements, with the outer shape approaching a "T".
25 The halftone dot shape of the uppermost halftone mountain 21 is characterized by sixteen exposed halftone elements, with the outer shape corresponding to a bar on one side of the halftone cell.
26*a* Raster tile consisting of sixteen raster cells, where the exposed raster elements take the form of a bar on the left side of the raster cells.
26*b* Raster tile consisting of sixteen halftone cells, where the exposed halftone elements take the form of two bars aligned at a 90° angle to each other. The tone value is higher than in the halftone tile shown above.
26*c* Halftone tile consisting of sixteen halftone cells, with the exposed halftone elements assuming a complex shape. The tonal value is even higher than in the aforementioned halftone tiles.
27*a* to 27*c* Visually perceived gray values corresponding to the halftone tiles described in 26*a* to 26*c*.
28*a* Bar-shaped halftone dot according to output file for exposure
28*b* Angular halftone point according to the output file for the exposure.
28*c* Halftone point with double angle shape according to output file for exposure
29*a* to 29*c* Distortions of the halftone dot shapes in the original print (exemplary) starting from the specified halftone dot shapes according to halftone dots 28*a* to 28*c*
30*a* to 30*c* Distortions of the halftone dot shapes in the copy (exemplary) starting from the halftone dot shapes of the original according to halftone dots 29*a* to 29*c*
31 to 37 Asymmetrically shaped halftone dots with decreasing tonal value and constantly changing, simpler shapes.

38 Evaluate a given image, e.g. from the subject of a package, with regard to protection according to the invention.
39 Selecting at least one detection zone
40 Determine raster mountain geometry by setting appropriate threshold parameters in the raster image process.
41 Calculate descriptor for recognition of characteristic halftone dot shapes.
42 Train descriptor (not a mandatory step). The training can be done either on the basis of original prints, e.g. from galley proofs, or by print-typical image changes due to color and paper properties, printing process and machine-typical influences
43 Deposit descriptor on a database
44 Make descriptor available via a server
45 Install an app for the halftone authentication according to the invention on a mobile device and parameterize it with the selected descriptor script after synchronization with the server.
46 Execute authentication as instructed by the app
47 Display of a mobile device, e.g. a smartphone
48 Symbol of an app for the authentication method according to the invention
49 Image to be examined with regard to originality
50 Gross orientation framework
51 Visual guidance symbolism
52 Detection zone; the mobile device is now in a suitable position to take an image of the detection zone.
53 Authentication result
54 Start App
55 Select image
56 Selecting the approximate position of the detection zone
57 Software (app) guides the user to the optimal position
58 Execute authentication
59 Authentication result is presented
135 Unexposed corner
136 Exposed central tip
137 Exposed corner tip
138 U shaped halftone dot
139 T shaped halftone dot
140 Bar shaped halftone dot
141 Exposed tip at one side edge
150 Side edge of a halftone cell

The invention claimed is:

1. A method of printing authentication indicators by applying an at least amplitude-modulated halftone print in a detection zone to an object, comprising:
providing a halftone mountain having a plurality of halftone planes with a predetermined halftone dot assignment for each plane, wherein individual tone values of the at least amplitude-modulated halftone print are associated to the plurality of halftone planes for a halftone dot to be printed, wherein the predetermined halftone dot assignment is changing between subsequent halftone planes of the plurality of halftone planes for different tone values creating asymmetrically modified matrix images over said subsequent halftone planes,
providing adjoining halftone cells in the detection zone, wherein each of the adjoining halftone cells comprises a plurality of printable halftone elements, and
printing the halftone dot in each of the adjoining halftone cells from the asymmetrically modified matrix images of the plurality of printable halftone elements.

2. The method according to claim 1, wherein the plurality of halftone planes for a subplurality of the plurality of tone values deviate from 0% and 100% with respect to the dot symmetry of the tone values.

3. The method according to claim 1, wherein the distribution of the printable halftone elements for a predetermined tone value in the matrix of a halftone cell is selected from the asymmetrically modified matrix image of a distribution group comprising a corner of a halftone cell, an edge line of a halftone cell, a C-shape, an L-shape, a T-shape or a non-point symmetric and non-axis symmetric printing form.

4. The method according to claim 3, wherein the distribution of the printable halftone elements in the halftone mountain changes from the tone value 100% to the tone value 0% from a dot-symmetric solid print via a first asymmetrically modified matrix image from said distribution group to at least a second different asymmetrically modified matrix image from said distribution group.

5. The method according to claim 1, wherein two or more detection zones are provided, wherein halftone mountains are provided in two or more colors, wherein the halftone mountains for a same color in each two detection zones are equal to each other.

6. The method according to claim 1, wherein two or more detection zones are provided, wherein halftone mountains are provided in two or more colors, and wherein the halftone mountains of the asymmetrically modified matrix image for a same color in each of the two or more detection zones are different from each other.

7. The method according to claim 1, wherein halftone mountains are provided in two or more colors, and wherein the halftone mountains for different colors are the same.

8. The method according to claim 1, wherein halftone mountains are provided in two or more colors, and wherein the halftone mountains for different colors differ from each other.

9. The method according to claim 1, wherein the individual tone values of the asymmetrically modified matrix image for the printable halftone elements to be printed are provided in the range of 40 to 90%.

10. The method according to claim 9, wherein the individual tone values of the asymmetrically modified matrix image for the printable halftone elements to be printed are provided in the range of 50 to 80%.

11. An authenticating method of a printed object, wherein an at least amplitude-modulated halftone print in a detection zone is printed on the printed object, comprising:
providing a portable image capture device having a microprocessor for executing an authentication program and having access to print data relating to the printed object;
storing in print data:
data relating to a halftone mountain having a plurality of halftone planes, with a predetermined halftone dot assignment for each plane, wherein individual tone values of the at least amplitude-modulated halftone print are associated to the plurality of halftone planes for a halftone dot to be printed, wherein the predetermined halftone dot assignment is changing between subsequent halftone planes for different tone values creating asymmetrically modified matrix images over said subsequent halftone planes,
data relating to adjoining halftone cells in the detection zone, wherein each halftone cell comprises a plurality of printable halftone elements, and data relating to printed halftone dots in the adjoining halftone cells from the asymmetrically modified matrix images of the plurality of printable halftone elements, taking an image of the detection zone of the printed object;

selecting a predetermined number of halftone dots in said detection zone from the image of the printed object;

determining a print image of the detection zone predetermined from halftone mountain data for a predetermined number of halftone dots of the printed object from said detection zone for one or more individual tone values;

providing a first computer program for identifying captured halftone dots from the image of the detection zone of the printed object;

providing a second computer program for comparing the captured halftone dots with the print image predetermined from the halftone mountain data for the plurality of individual tone values;

comparing the print image of the predetermined number of halftone dots with the print images predetermined from the halftone mountain data for the plurality of individual tone values; and deciding on the basis of the comparison whether or not there is an original print on the printed object.

12. The authentication method according to claim 11, wherein different halftone dots to be compared are randomly or predeterminedly selected from the detection zone for the comparison.

13. The authentication method according to claim 11, wherein different colors to be compared are randomly or predeterminedly selected from the detection zone for the comparison.

14. The method according to claim 1, wherein a number of different colors are printed in different layers, wherein only an uppermost printing layer is printed using the halftone mountain with the predetermined halftone dot assignment for each plane changing between subsequent halftone planes for different tone values creating the asymmetrically modified matrix images.

15. The authentication method according to claim 11, wherein the at least amplitude-modulated halftone print in the detection zone printed on the printed object is an uppermost printing layer of a number of different colors printed in different layers.

* * * * *